United States Patent
Lakshman et al.

(10) Patent No.: US 9,798,489 B2
(45) Date of Patent: Oct. 24, 2017

(54) CLONING A VIRTUAL DISK IN A STORAGE PLATFORM

(71) Applicant: Hedvig, Inc., Santa Clara, CA (US)

(72) Inventors: Avinash Lakshman, Fremont, CA (US); Srinivas Lakshman, San Jose, CA (US)

(73) Assignee: HEDVIG, INC., Santa Clara, CA (US)

( * ) Notice: Subject to any disclaimer, the term of this patent is extended or adjusted under 35 U.S.C. 154(b) by 63 days.

(21) Appl. No.: 14/322,867

(22) Filed: Jul. 2, 2014

(65) Prior Publication Data
US 2016/0004449 A1    Jan. 7, 2016

(51) Int. Cl.
*G06F 3/06* (2006.01)
*G06F 9/455* (2006.01)
*G06F 11/14* (2006.01)

(52) U.S. Cl.
CPC ............ *G06F 3/065* (2013.01); *G06F 3/0604* (2013.01); *G06F 3/067* (2013.01); *G06F 3/0664* (2013.01); *G06F 9/45558* (2013.01); *G06F 11/1451* (2013.01); *G06F 2009/45579* (2013.01); *G06F 2201/84* (2013.01)

(58) Field of Classification Search
CPC ............ G06F 11/1451; G06F 11/1453; G06F 11/1456; G06F 17/30088; G06F 2201/84; G06F 3/065; G06F 3/0604; G06F 3/067; G06F 9/45558; G06F 2009/45579
See application file for complete search history.

(56) References Cited

U.S. PATENT DOCUMENTS

| 7,076,509 | B1 * | 7/2006 | Chen ...................... G06F 3/0605 |
| 7,373,451 | B2 | 5/2008 | Lam et al. |
| 7,653,669 | B2 * | 1/2010 | Kapoor ............ G06F 17/30067 707/649 |

(Continued)

FOREIGN PATENT DOCUMENTS

| WO | WO 01/61507 | 8/2001 |
| WO | WO 2014/008495 | 1/2014 |

OTHER PUBLICATIONS

Swiftstack, Inc., "The OpenStack Object Storage System," Feb. 2012, pp. 1-29.*

(Continued)

*Primary Examiner* — Tuan Thai
*Assistant Examiner* — Glenn Gossage
(74) *Attorney, Agent, or Firm* — Beyer Law Group LLP

(57) ABSTRACT

An administrator provisions a virtual disk in a remote storage platform and defines policies for that virtual disk. A virtual machine writes to and reads from the storage platform using any storage protocol. Virtual disk data within a failed storage pool is migrated to different storage pools while still respecting the policies of each virtual disk. Snapshot and revert commands are given for a virtual disk at a particular point in time and overhead is minimal. A virtual disk is cloned utilizing snapshot information and no data need be copied. Any number of Zookeeper clusters are executing in a coordinated fashion within the storage platform, thus increasing overall throughput. A timestamp is generated that guarantees a monotonically increasing counter, even upon a crash of a virtual machine. Any virtual disk has a "hybrid cloud aware" policy in which one replica of the virtual disk is stored in a public cloud.

6 Claims, 24 Drawing Sheets

(56) References Cited

U.S. PATENT DOCUMENTS

| | | | |
|---|---|---|---|
| 7,925,624 B2 | 4/2011 | Vosshall et al. | |
| 8,041,888 B2* | 10/2011 | Rajan | G06F 17/30067 707/624 |
| 8,260,751 B2 | 9/2012 | Johnson et al. | |
| 8,312,046 B1 | 11/2012 | Eisler et al. | |
| 8,364,639 B1* | 1/2013 | Koryakina | G06F 11/1458 707/639 |
| 8,386,838 B1 | 2/2013 | Byan | |
| 8,413,142 B2* | 4/2013 | Sharp | G06F 3/0605 718/1 |
| 8,453,145 B1 | 5/2013 | Naik | |
| 8,458,422 B1 | 6/2013 | Holdman et al. | |
| 8,601,473 B1* | 12/2013 | Aron | G06F 9/45533 709/223 |
| 8,762,430 B1 | 6/2014 | Hall | |
| 8,850,130 B1* | 9/2014 | Aron | G06F 9/52 711/150 |
| 8,861,527 B1 | 10/2014 | Bao et al. | |
| 9,009,106 B1* | 4/2015 | Aron | G06F 11/14 707/610 |
| 9,053,339 B2* | 6/2015 | Pate | G06F 21/6218 |
| 2002/0019908 A1* | 2/2002 | Reuter | G06F 3/0605 711/112 |
| 2002/0133669 A1* | 9/2002 | Devireddy | G06F 3/0605 711/114 |
| 2003/0145167 A1 | 7/2003 | Tomita | |
| 2003/0182494 A1 | 9/2003 | Rodrigues et al. | |
| 2004/0250033 A1* | 12/2004 | Prahlad | G06F 11/1451 711/162 |
| 2005/0108292 A1 | 5/2005 | Burton et al. | |
| 2005/0246393 A1 | 11/2005 | Coates et al. | |
| 2005/0246397 A1* | 11/2005 | Edwards | G06F 17/30067 |
| 2005/0256972 A1 | 11/2005 | Cochran et al. | 709/245 |
| 2006/0168402 A1 | 7/2006 | Ahmad et al. | |
| 2007/0038888 A1 | 2/2007 | Kariv | |
| 2007/0106706 A1* | 5/2007 | Ahrens | G06F 17/30088 |
| 2008/0183973 A1* | 7/2008 | Aguilera | G06F 11/1464 711/147 |
| 2008/0201535 A1 | 8/2008 | Hara | |
| 2008/0244028 A1* | 10/2008 | Le | G06F 3/0607 709/208 |
| 2009/0055427 A1* | 2/2009 | Kulasingam | H04L 41/5006 |
| 2009/0210875 A1 | 8/2009 | Bolles et al. | |
| 2009/0282404 A1* | 11/2009 | Khandekar | G06F 9/45558 718/1 |
| 2010/0199126 A1 | 8/2010 | Noguchi et al. | |
| 2010/0223368 A1* | 9/2010 | Runcie | G06F 9/5077 709/222 |
| 2010/0257403 A1* | 10/2010 | Virk | G06F 11/1453 714/15 |
| 2011/0185355 A1* | 7/2011 | Chawla | G06F 9/5077 718/1 |
| 2011/0246984 A1 | 10/2011 | Sharp et al. | |
| 2012/0084598 A1 | 4/2012 | Alibakhsh et al. | 714/4.11 |
| 2012/0110275 A1 | 5/2012 | Ganti et al. | 711/153 |
| 2012/0110328 A1 | 5/2012 | Pate et al. | |
| 2012/0323853 A1* | 12/2012 | Fries | G06F 11/301 707/649 |
| 2013/0007183 A1 | 1/2013 | Sorenson, III et al. | |
| 2013/0007436 A1 | 1/2013 | Bookman et al. | |
| 2013/0055371 A1 | 2/2013 | Kumano et al. | |
| 2013/0111471 A1* | 5/2013 | Chandrasekaran | G06F 9/455 718/1 |
| 2013/0166849 A1 | 6/2013 | Beukema et al. | 711/147 |
| 2013/0191577 A1 | 7/2013 | Thomas et al. | |
| 2013/0239106 A1* | 9/2013 | Srinivasan | G06F 9/45558 718/1 |
| 2013/0262387 A1* | 10/2013 | Varadharajan | G06F 17/30581 707/639 |
| 2013/0262390 A1* | 10/2013 | Kumarasamy | H04L 41/08 707/649 |
| 2013/0263114 A1 | 10/2013 | Watkins et al. | |
| 2013/0305002 A1 | 11/2013 | Hallak et al. | |
| 2013/0326053 A1 | 12/2013 | Bauer et al. | |
| 2014/0040206 A1 | 2/2014 | Ramakrishnan et al. | |
| 2014/0059375 A1 | 2/2014 | Mcelhoe et al. | |
| 2014/0156925 A1* | 6/2014 | Baron | G06F 3/0605 711/114 |
| 2014/0181397 A1 | 6/2014 | Bonzini | |
| 2014/0188825 A1 | 7/2014 | Muthukkaruppan et al. | |
| 2014/0282509 A1* | 9/2014 | Zheng | G06F 9/45558 718/1 |
| 2014/0317618 A1* | 10/2014 | Behera | G06F 9/5077 718/1 |
| 2014/0344809 A1* | 11/2014 | Jin | H04L 67/2823 718/1 |
| 2014/0379983 A1 | 12/2014 | Sasaki | |
| 2015/0074662 A1* | 3/2015 | Saladi | G06F 17/5022 718/1 |
| 2015/0088586 A1* | 3/2015 | Pavlas | G06F 9/45558 705/7.25 |
| 2015/0134616 A1 | 5/2015 | Zheng et al. | |
| 2016/0202916 A1* | 7/2016 | Cui | G06F 3/065 711/162 |

OTHER PUBLICATIONS

Office Action dated Feb. 9, 2016 from U.S. Appl. No. 14/322,868.
Office Action dated Feb. 25, 2016 from U.S. Appl. No. 14/322,813.
Office Action dated Mar. 2, 2016 from U.S. Appl. No. 14/322,832.
Office Action dated Mar. 2, 2016 from U.S. Appl. No. 14/684,086.
Notice of Allowance dated Mar. 29, 2016 from U.S. Appl. No. 14/322,871.
Notice of Allowance dated Apr. 7, 2016 from U.S. Appl. No. 14/322,850.
International Search Report dated Jan. 13, 2016 from International Application No. PCT/US2015/038687.
Written Opinion dated Jan. 13, 2016 from International Application No. PCT/US2015/038687.
U.S. Office Action dated Jan. 15, 2016 from U.S. Appl. No. 14/322,850.
U.S. Office Action dated Jan. 20, 2016 from U.S. Appl. No. 14/322,855.
U.S. Office Action dated Dec. 17, 2015 from U.S. Appl. No. 14/322,871.

* cited by examiner

Virtual Disk Management Add Disk

Storage Pools

Version Tree For Virtual Disk

CLONING A VIRTUAL DISK IN A STORAGE PLATFORM

CROSS-REFERENCE TO RELATED APPLICATIONS

This application is related to U.S. patent application Ser. Nos. 14/322,813; 14/322,832; 14/322,850, now U.S. Pat. No. 9,424,151; Ser. No. 14/322,855, now U.S. Pat. No. 9,558,085; Ser. No. 14/322,868, now U.S. Pat. No. 9,483,205; and Ser. No. 14/322,871, now U.S. Pat. No. 9,411,534, which are hereby incorporated by reference.

FIELD OF THE INVENTION

The present invention relates generally to data storage within a data center. More specifically, the present invention relates to storage techniques and virtual disks within such a data center.

BACKGROUND OF THE INVENTION

In the field of data storage, enterprises have used a variety of techniques in order to store the data that their software applications use. At one point in time, each individual computer server within an enterprise running a particular software application (such as a database or e-mail application) would store data from that application in any number of attached local disks. Although this technique was relatively straightforward, it led to storage manageability problems in that the data was stored in many different places throughout the enterprise.

These problems led to the introduction of the storage area network in which each computer server within an enterprise communicated with a central storage computer node that included all of the storage disks. The application data that used to be stored locally at each computer server was now stored centrally on the central storage node via a fiber channel switch, for example. Although such a storage area network was easier to manage, changes in computer server architecture created new problems.

With the advent of virtualization, each computer server could now host dozens of software applications through the use of a hypervisor on each computer server and the use of virtual machines. Thus, computer servers which had been underutilized could now host many different server applications, each application needing to store its data within the storage area network. Weaknesses in the storage area network were revealed by the sheer number of server applications needing to access disks within the central storage node. For example, the storage node was taxed by the sheer number of requests from all of the application servers. Although additional storage nodes could be added (each with multiple disks), these nodes were expensive, were oblivious to the other nodes, and had to be managed individually. Another weakness was trying to manage replication of files and disaster recovery. Also, provisioning a new storage disk for a particular virtual machine could take as long as four weeks, much too long for today's pace of innovation. And, in order to configure a storage system, some prior technologies required the administrator to first purchase a monolithic hardware box and then one-by-one add the functionalities that he or she desired to protect the data stored on that hardware. For example, it was often necessary to purchase separate products (or licenses) to perform compression, replication, de-duplication, etc.

In response, new storage services have emerged, such as an Elastic Block Service, which have attempted to make provisioning easier, simplify policy management and drive down costs. Unfortunately, this type of service only provides a block-level service, among other deficiencies.

SUMMARY OF THE INVENTION

To achieve the foregoing, and in accordance with the purpose of the present invention, a number of storage techniques are disclosed that provide the advantages discussed below.

The present application provides systems and methods that may be implemented upon off-the-shelf hardware and in a variety of types of data centers. The present invention also provides: incremental scalability, allowing a data center or enterprise to add only those computer nodes necessary for increased storage capacity; a user-friendly management console to provision virtual disks quickly and easily; and, the ability to define unique policies for specific virtual disks. Unlike current cloud storage services, the present invention provides much finer granularity in that an enterprise or data center may provision a single virtual disk with its own unique properties for an application server, and may define unique sets of policies upon different virtual disks.

Advantageously, the management console allows an administrator to create a virtual disk (using off-the-shelf hardware within the storage platform) and provision that virtual disk with functionalities needed to protect the data (e.g., compression, replication, de-duplication, etc.) that may be specified for that virtual disk.

Larger companies will benefit by deploying embodiments of the present invention within their own data centers, while data storage service providers (e.g., RACK SPACE) will benefit by deploying embodiments of the present invention within a data center in order to serve their clients needing storage. Embodiments may also be deployed within the public cloud data centers provided by companies like AMAZON.

In a first embodiment, an administrator of a storage system is able to provision a virtual disk in a remote storage platform for a software application and can define policies and characteristics that apply to that virtual disk only. Policy granularity is fine as each virtual disk may have different policies.

In a second embodiment, a software application running within a virtual machine on a host computer is able to write to and read from a remote storage platform using the storage protocol of its choice. A controller virtual machine on the host computer intercepts these requests and then communicates with the remote storage platform using a single protocol. One platform can handle block protocols, Network File System (NFS) protocols, and object writes.

In a third embodiment, all computer nodes within a storage platform work together to recover lost data if a disk fails. Virtual disk data within a storage pool that includes the failed disk is migrated to different storage pools while still respecting the policies of each virtual disk.

In a fourth embodiment, snapshot and revert commands may be given for a virtual disk at a particular point in time. Overhead is minimal as only version and version tree information need be stored when a snapshot command is given.

In a fifth embodiment, a virtual disk may be cloned utilizing snapshot information. The clone virtual disk is provisioned as is any other virtual disk, yet no data need be copied as reads occur from the parent disk unless data has been written into the clone virtual disk.

In a sixth embodiment, any number of ZOOKEEPER clusters may be executing within the storage platform. A software application writes (or reads) to a single cluster and this write is handled by any one of the clusters, thus increasing the overall throughput.

In a seventh embodiment, a timestamp is generated that guarantees a monotonically increasing counter. Even upon a crash or other restart of a virtual machine (or of the host machine), the timestamp is guaranteed to be monotonically increasing.

In an eighth embodiment, any virtual disk is allowed to have a "hybrid cloud aware" policy. This policy dictates that at least one replica of the virtual disk must be stored in a public storage cloud, in addition to any other replicas stored in a private data center.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Storage System

Figure 1:
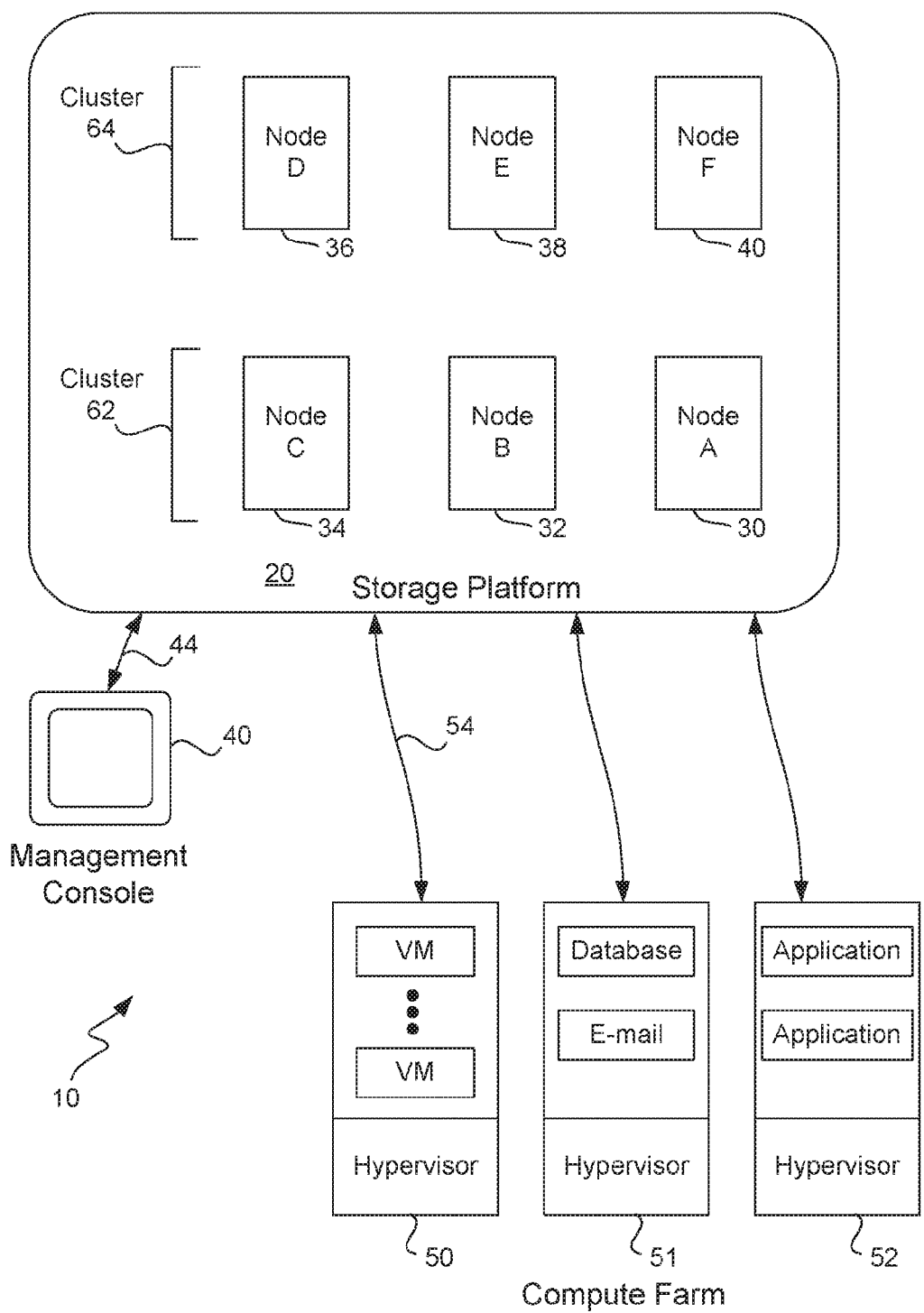
FIG. 1 illustrates a data storage system having a storage platform according to one embodiment of the invention.

FIG. 1 illustrates a data storage system 10 according to one embodiment of the invention having a storage platform 20. Included within the storage platform 20 are any number of computer nodes 30-40. Each computer node of the storage platform has a unique identifier (e.g., "A") that uniquely identifies that computer node within the storage platform. Each computer node is a computer having any number of hard drives and solid-state drives (e.g., flash drives), and in one embodiment includes about twenty disks of about 1 TB each. A typical storage platform may include on the order of about 81 TB and may include any number of computer nodes. One advantage is that a platform may start with as few as three nodes and then grow incrementally to as large as 1,000 nodes or more.

Computers nodes 30-40 are shown logically being grouped together, although they may be spread across data centers and may be in different geographic locations. A management console 40 used for provisioning virtual disks within the storage platform communicates with the platform over a link 44. Any number of remotely located computer servers 50-52 each typically executes a hypervisor in order to host any number of virtual machines. Server computers 50-52 form what is typically referred to as a compute farm.

As shown, these virtual machines may be implementing any of a variety of applications such as a database server, an e-mail server, etc., including applications from companies such as ORACLE, MICROSOFT, etc. These applications write to and read data from the storage platform using a suitable storage protocol such as iSCSI or NFS, although each application will not be aware that data is being transferred over link 54 using a generic protocol implemented by the present invention.

Management console 40 is any suitable computer able to communicate over an Internet connection or link 44 with storage platform 20. When an administrator wishes to manage the storage platform (e.g., provisioning a virtual disk, snapshots, revert, clone, analyze metrics, determine health of cluster, etc.) he or she uses the management console to access the storage platform and is put in communication with a management console routine executing as part of metadata module 130 (shown in FIG. 2) on any one of the computer nodes within the platform. The management console routine is typically a Web server application.

In order to provision a new virtual disk within storage platform 20 for a particular application running on a virtual machine, the virtual disk is first created and then attached to a particular virtual machine. In order to create a virtual disk, a user uses the management console to first select the size of the virtual disk (e.g., 100 GB), and then selects the individual policies that will apply to that virtual disk. For example, the user selects a replication factor, a data center aware policy and other policies concerning whether or not to compress the data, the type of disk storage, etc. Once the virtual disk has been created, it is then attached to a particular virtual machine within one of the computer servers 50-52 and the provisioning process is complete.

Advantageously, storage platform 20 is able to simulate prior art central storage nodes (such as the VMAX and CLARION products from EMC, VMWARE products, etc.) and the virtual machines and application servers will be unaware that they are communicating with storage platform 20 instead of a prior art central storage node. In addition, the provisioning process can be completed on the order of minutes or less, rather than in four to eight weeks as was typical with prior art techniques. The advantage is that one only need to add metadata concerning a new virtual disk in order to provision the disk and have the disk ready to perform writes and reads. No allocation of actual physical storage is needed.

Figure 2:
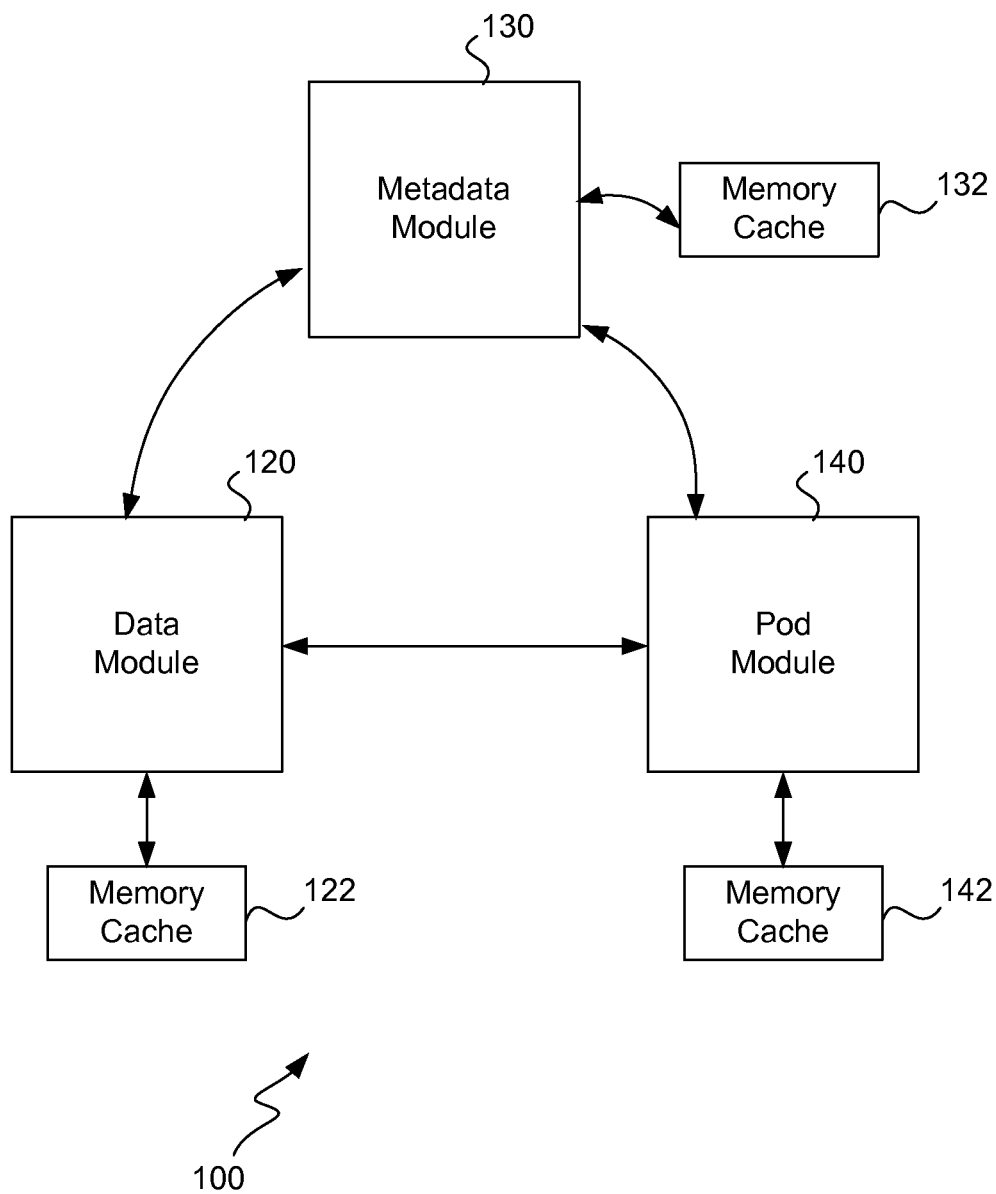
FIG. 2 illustrates software modules used within the storage system.

FIG. 2 illustrates software modules used within storage system 10. Shown is a data module 120, a metadata module 130 and a pod module 140. Data module handles the storage of data (such as blocks of data, files, objects, etc.) onto individual computer nodes 30-40. Metadata module handles the storage of metadata within the platform, that is, data that helps describe the data. Metadata includes all of the virtual disk information described below in FIG. 6, for example. Pod module is a coordinator module and also stores transaction states as will be explained in greater detail below.

Although shown as three modules, each of the modules runs independently on each of the computer nodes within the platform 20. Also, associated with each module on each node is a memory cache 122, 132 and 142 that stores information used by that module; each module on each computer node may also use persistent storage on that node. A file (for example) that is stored on nodes 32, 34 and 36 (FIG. 1), is referred to as being stored on its "data nodes 32, 34 and 36." The metadata for that file may be stored on three different nodes, and those nodes for that file are referred to as the "metadata nodes 30, 36 and 38." The data nodes and metadata nodes for a particular stored file may be the same or may be different. The modules communicate with each other via a modified version of GOSSIP over Transmission Control Protocol (TCP), and work in concert to manage the storage platform.

Figure 3:
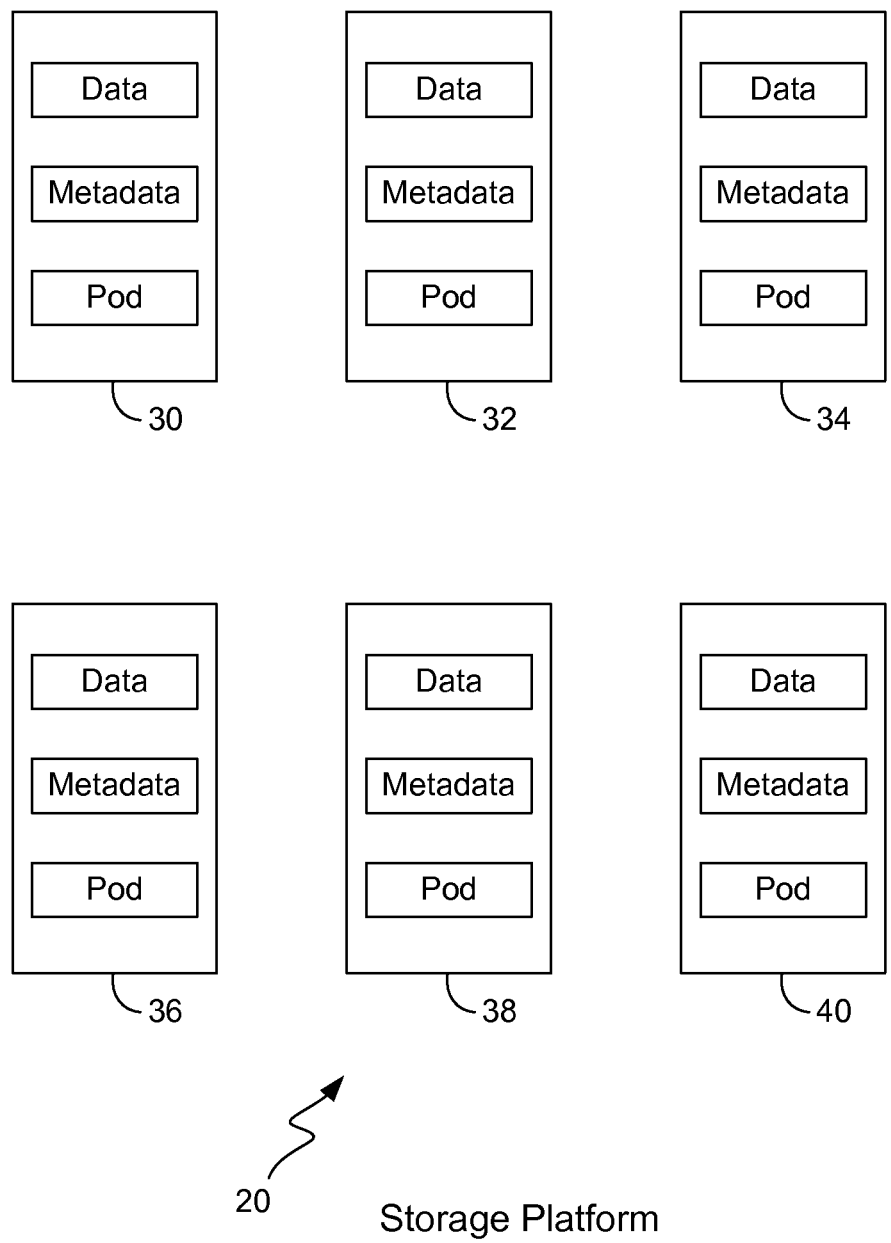
FIG. 3 illustrates in more detail the nodes of the storage platform.

FIG. 3 illustrates in more detail the nodes of platform 20. As shown, each node includes a data module, a metadata module and a pod module.

Controller Virtual Machine

Figure 4:
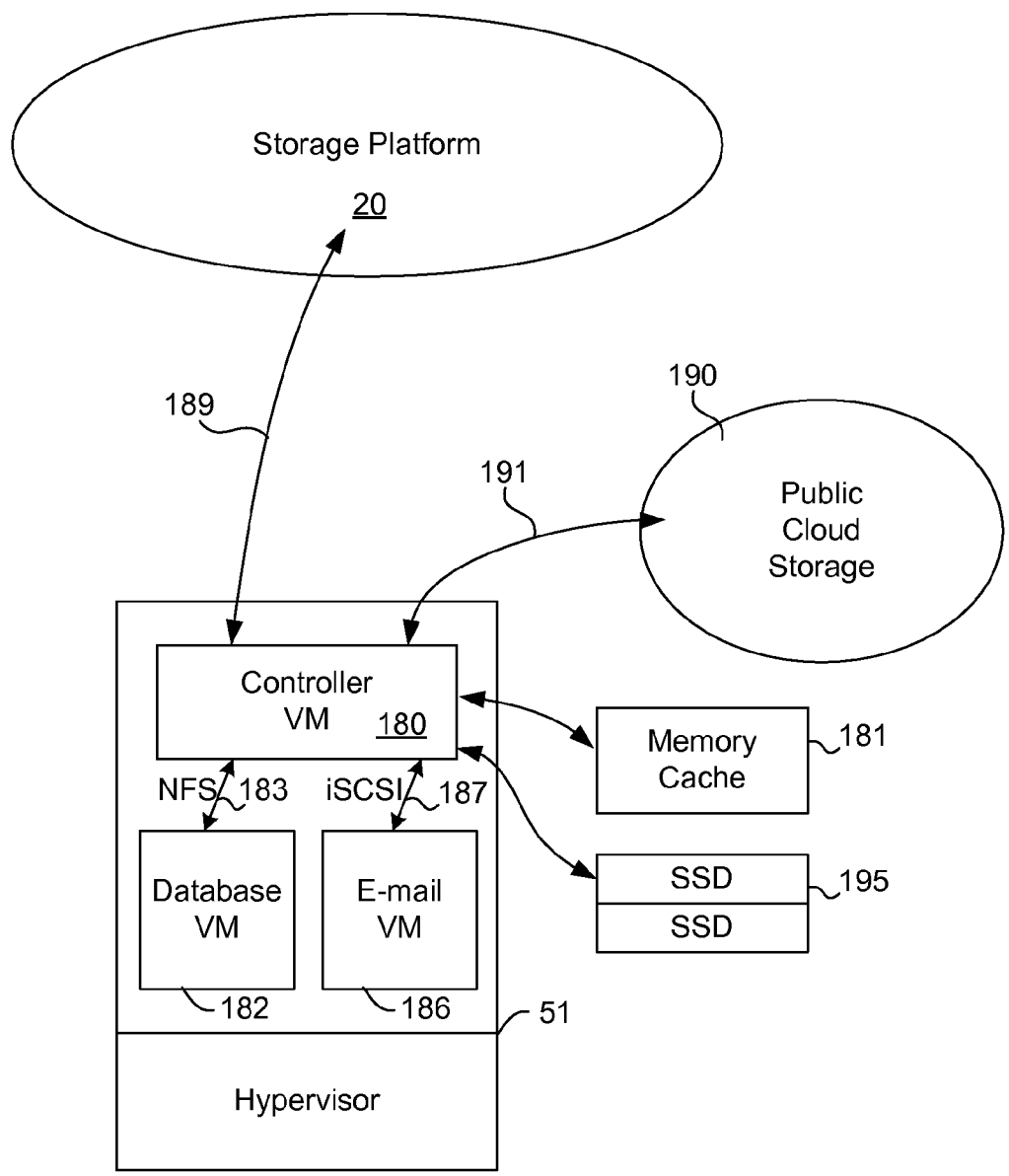
FIG. 4 illustrates in greater detail one of the computer servers in communication with the storage platform.

FIG. 4 illustrates in greater detail one of the computer servers 51 in communication with storage platform 20. As mentioned above, each computer server may host any number of virtual machines, each executing a particular software application. One advantage of the present invention is the ability of each virtual machine (or more specifically, the application executing on the virtual machine) to communicate with the storage platform using any of a variety of protocols. Typically, the application performs I/O handling using a block-based protocol such as iSCSI, or using a file-based protocol such as NFS. Each virtual machine may communicate with the storage platform using either of these protocols, and, the actual communication protocol used between server and platform is transparent to these virtual machines. Of course, other suitable protocols used by an application may also be used. One embodiment of the invention converges the possible protocols used by an application onto the single storage platform 20.

As shown, server 51 includes a hypervisor and virtual machines 182 and 186 that desire to perform I/O handling using respectively the NFS protocol 183 and the iSCSI protocol 187. Server 51 also includes a specialized controller virtual machine (CVM) 180 that is specially adapted to handle communications with the virtual machines using protocols 183 and 187, yet communicates with the storage platform using a proprietary protocol 189. Protocol 189 may be any suitable protocol for passing data between storage platform 20 and a remote computer server 51 such as TCP. In addition, the CVM may also communicate with public cloud storage using the same or different protocol 191. Advantageously, the CVM need not communicate any "liveness" information between itself and the computer nodes of the platform. There is no need for any CVM to track the status of nodes in the cluster. The CVM need only talk to a node in the platform, which is then able to route requests to other nodes and public storage nodes.

The CVM also uses a memory cache 181 on the computer server 51. In communication with computer server 51 and with CVM 180 are any number of solid-state disks (or other similar memory) 195. As discussed in further detail below with respects to steps 316 and 364 in FIG. 7, these disks are used as a data cache to also store data blocks that are written into storage platform 20. This cache may be used to rapidly retrieve data blocks instead of retrieving them from the remote storage platform.

CVM 180 handles different protocols by simulating an entity that the protocol would expect. For example, when communicating with an NFS client, CVM behaves as an NFS server; when communicating under the iSCSI protocol, CVM responds to an iSCSI Initiation by behaving as an iSCSI Target. Advantageously, use of the CVM allows an application executing upon a virtual machine to continue using the protocol it expects, yet allows these applications on the various computer servers to write data to and read data from the same storage platform 20.

When virtual machine 182 performs I/O handling the controller virtual machine is the NFS server and the NFS client (on behalf of virtual machine 182) executes either in the hypervisor of computer server 51 or in the operating system kernel of virtual machine 182. When virtual machine 186 performs I/O handling, it is the iSCSI initiator and the controller virtual machine is the iSCSI target.

During reads or writes, when either virtual machine 182 or 186 communicates with the controller virtual machine (either as an iSCSI target or as an NFS server), the controller virtual machine will convert this communication into its own protocol 189 in order to communicate with the storage platform. In this fashion, any of a variety of data storage protocols (183, 187, etc.) may be used to write data into and read data from the storage platform. In one embodiment, when an application is using the block protocol, the CVM masquerades as the iSCSI target, traps the iSCSI Command Descriptor Blocks (CDBs), translates this information into its own protocol, and then communicates this information to the storage platform. In another embodiment when an application is using the NFS protocol, the CVM masquerades as an NFS server, captures NFS packets, and then communicates this information to the storage platform using its own protocol.

One of the virtual machines in computer server 51 may also communicate directly with the storage platform 20 (or with any data center) using a protocol such as Representational State Transfer (REST) in which the CVM is bypassed completely. But, such a technique would require the developer of the application running on the virtual machine to rewrite a substantial portion of that application. Using an embodiment of the present invention in which the CVM is able to present itself as either an NFS server or an iSCSI target (using a software module for each protocol), the application may simply talk to the underlying file system (in the case of NFS) or talk to a block device (in the case of iSCSI) as it would do normally. The application is unaware that the CVM is trapping and intercepting its calls under these protocols or that the CVM even exists. The advantage is that an application need not be changed in order to write to and read from the storage platform.

Provision Virtual Disk

Figure 5:
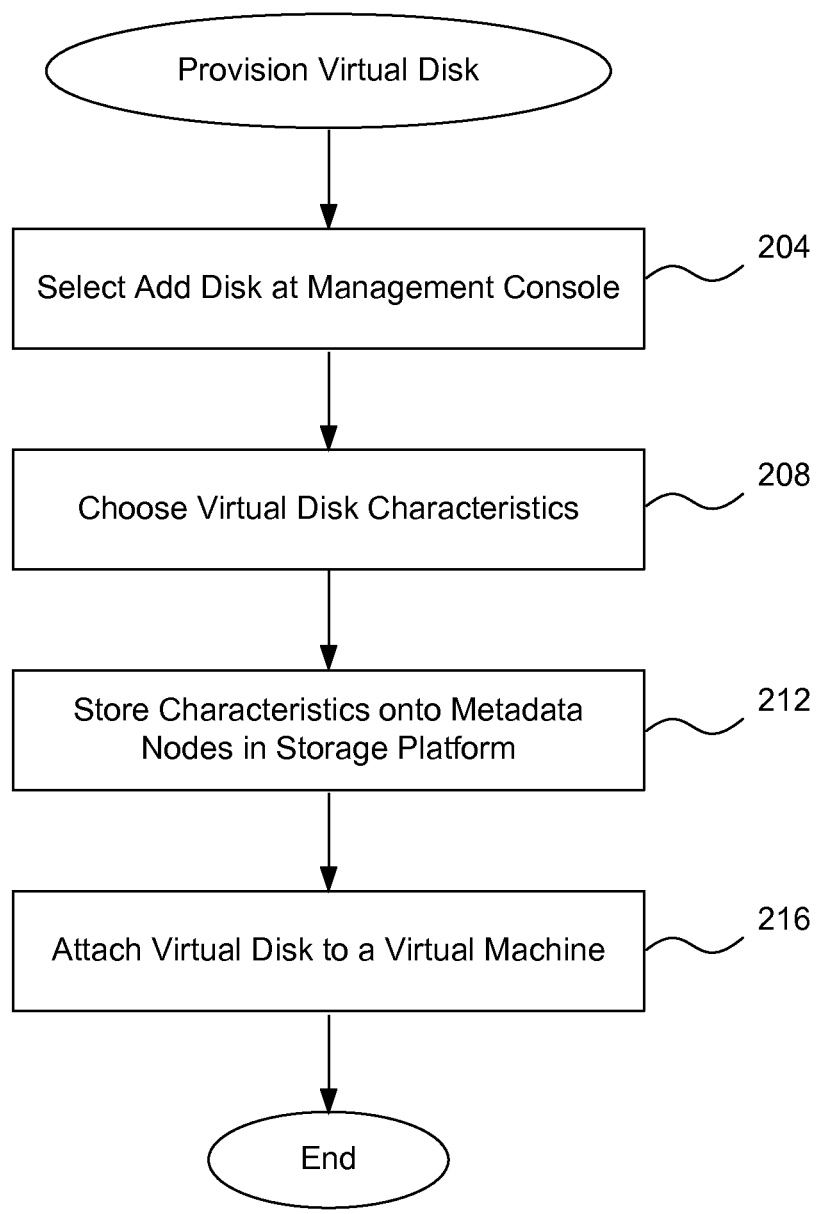
FIG. 5 is a flow diagram describing one embodiment by which an administrator provisions a virtual disk within the platform.

FIG. 5 is a flow diagram describing one embodiment by which an administrator provisions a virtual disk within platform 20. In this situation, the administrator is aware that a particular virtual machine desires a virtual disk within the platform and is aware of the characteristics that the virtual disk should have. The administrator first uses the management console to access the platform and connect with the management console Web server on any one of the computer nodes within the platform.

Figure 6:
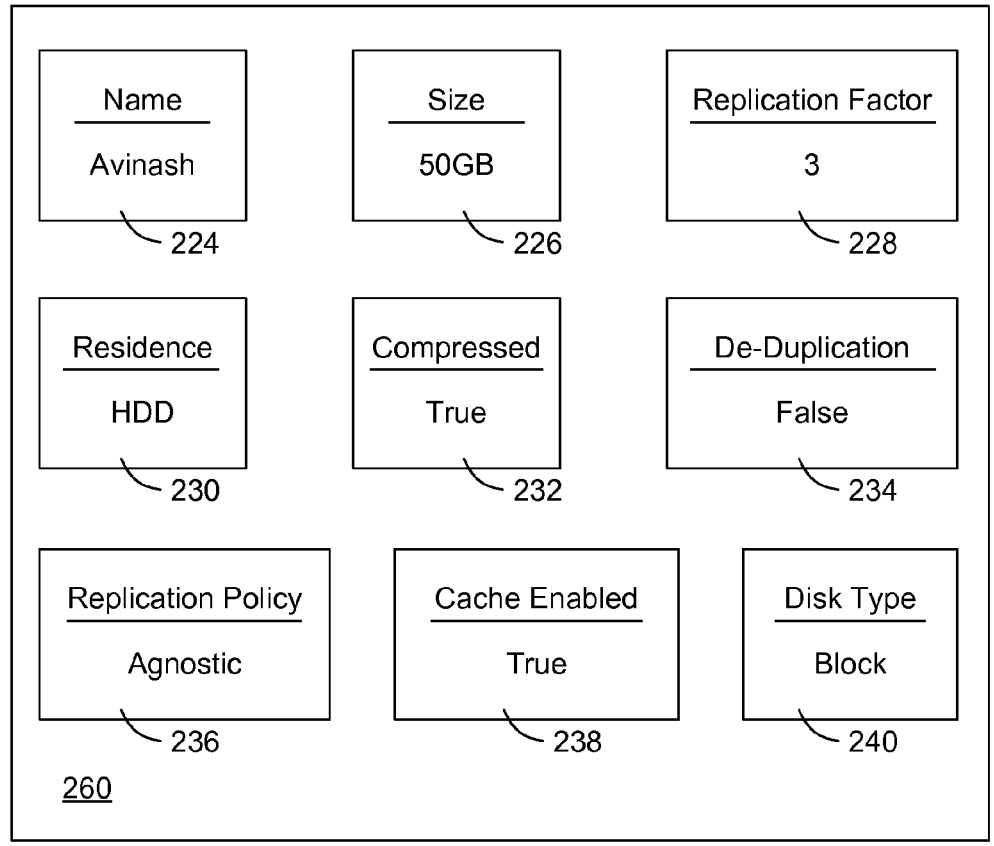
FIG. 6 illustrates a user interface window presented to an administrator in the course of provisioning a virtual disk.

FIG. 6 illustrates a user interface window 220 presented to an administrator in the course of provisioning a virtual disk. In step 204 (FIG. 5) the administrator chooses the "Add Disk" option from within the management console routine and is presented with a window such as shown in FIG. 6. In step 208 (FIG. 5) the administrator uses window 220 in order to choose the characteristics of the new virtual disk.

For example, the administrator chooses: a name 224 for the new virtual disk; a size 226 for the virtual disk; a replication factor 228 (indicating how many replicas of the data should be stored within the platform); a residence 230 (indicating whether the data on the virtual disk should be stored on hard disk drives, on flash drives or on any other type of storage drive); compressed 232 (indicating whether the data on the virtual disk should be compressed or not); de-duplication 234 (indicating whether duplicates of the data should be saved to the virtual disk or not); a replication policy 236 (agnostic, data center aware, rack aware, or hybrid cloud aware); cache enabled 238 (a quality of service choice); and disk type 240 (indicating whether the virtual disk is of a block type—the iSCSI protocol—or whether the virtual disk is of a file type—the NFS protocol). Concerning the Disk Type 240, this information is saved so that the CVM is aware of whether it should masquerade as a block device or as an NFS device in order to communicate with the application that wishes to write to or read from the virtual disk.

Replication policy 236 may be "agnostic," meaning that the virtual disk (or rather, the application on the virtual machine or the owner of the virtual disk) does not care on which rack or in which data center the replicas are stored. If the policy is "rack aware" this means that more than one replica may not be stored on the same rack within a particular data center. The rack aware policy refers to the fact that computers within a data center are typically clustered into racks. Typically, there are twenty computer servers per rack or as many as forty. On the top of each rack is a network switch used to route information between the various computer servers (also called a "top-of-the-rack switch"). Should this switch fail then all the data located on the computer servers within the rack will become inaccessible or may be lost. Accordingly, an application may desire that its replicas not be stored in the same rack. Choosing the rack aware policy then, requires that no more than one replica of a particular virtual disk be stored on a single rack. If the policy is "data center aware" this means that replicas must be distributed between data centers in geographically different locations. If the policy is "hybrid cloud aware" this means that at least one replica must be stored within public cloud storage 190, in addition to the other replicas stored within storage platform 20.

As shown in FIG. 4, replicas of a virtual disk may be stored within public cloud storage 190. As known in the art, public cloud storage refers to those data centers operated by enterprises that allow the public to store data for a fee. Included within these data centers are those known as AMAZON WEB SERVICES and GOOGLE COMPUTE. During a write request, the write request will include an identifier for each computer node to which a replica should be written. For example, nodes may be identified by their Internet Protocol (IP) address. Thus, the computer node within the platform that first fields the write request from the CVM will then route the data to be written to nodes identified by their Internet Protocol (IP) addresses. Any replica that should be sent to the public cloud can then simply be sent to the Domain Name Server (DNS) name of a particular node which request (and data) is then routed to the appropriate public storage cloud. Any suitable computer router within the storage platform may handle this operation.

Figure 22A:
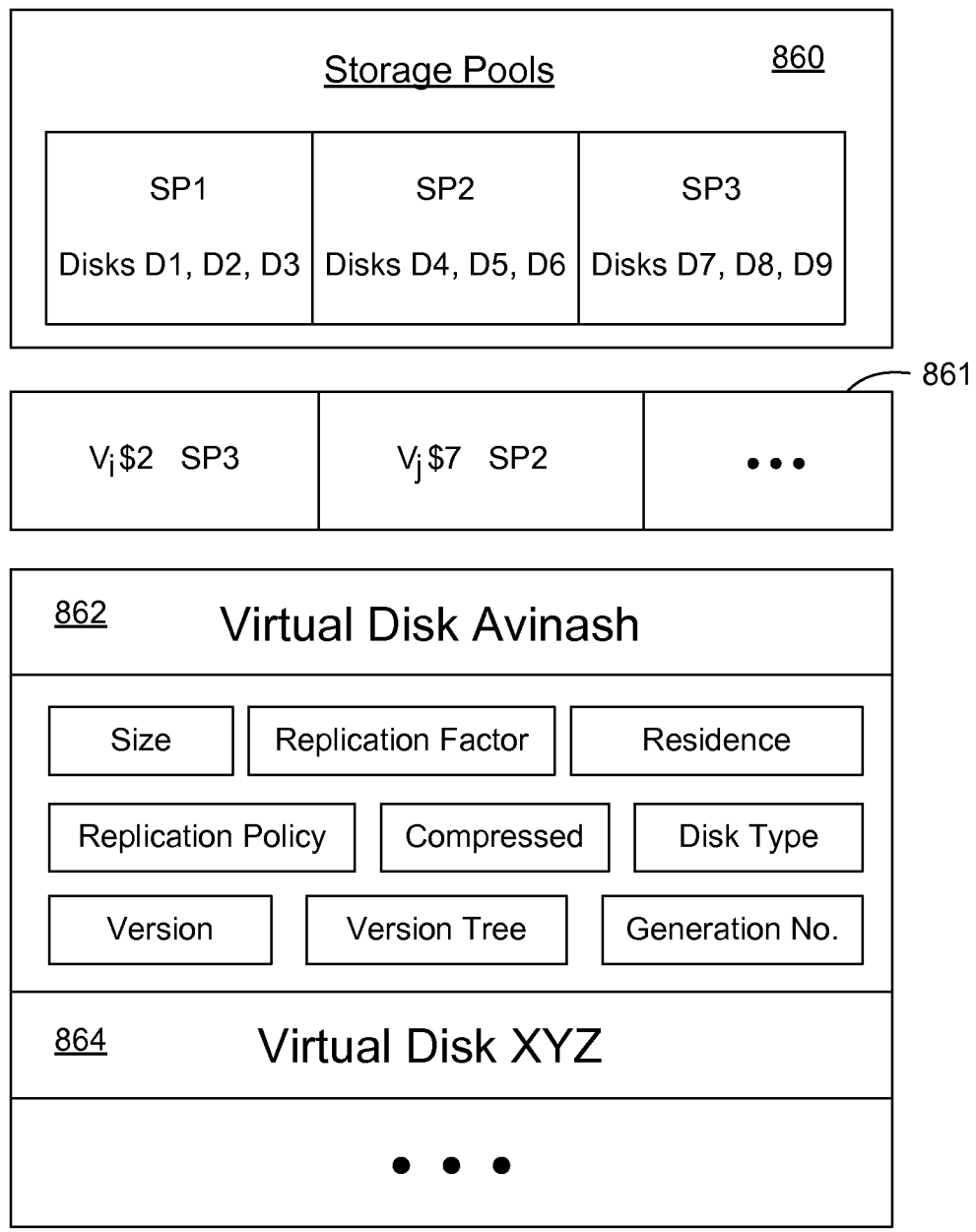
FIGS. 22A and 22B illustrate metadata storage within the platform.
Figure 22B:
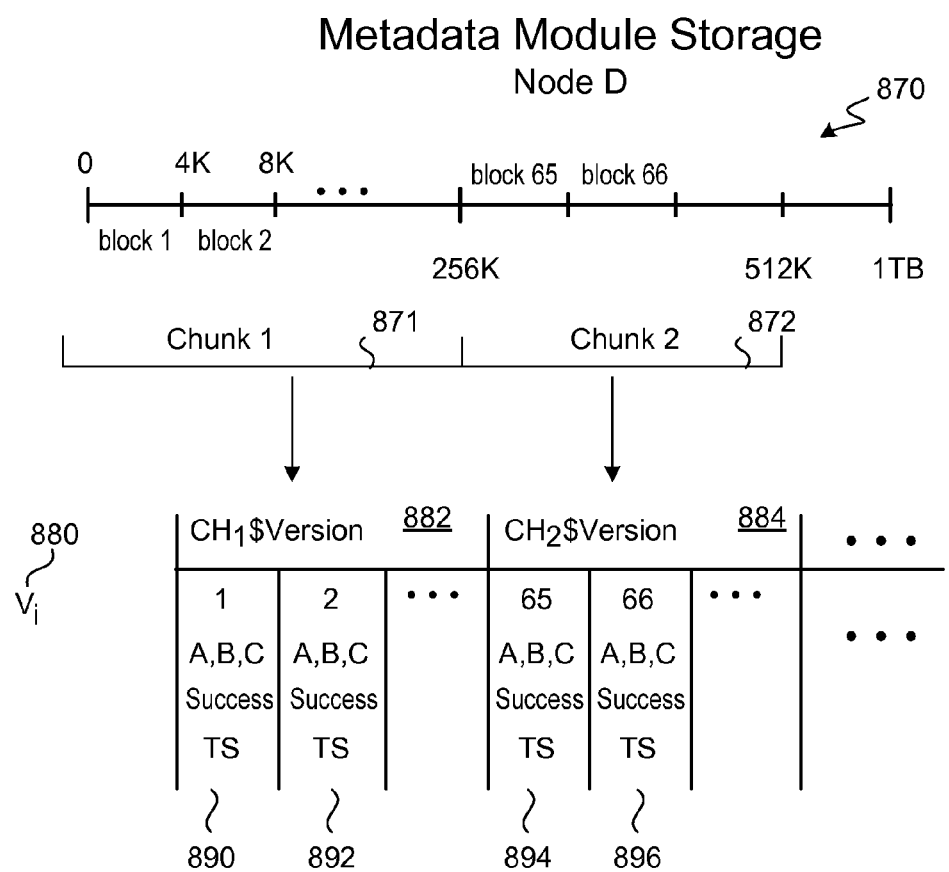

Once the characteristics of the virtual disk have been chosen, then in step 212 (FIG. 5) these characteristics are stored as "virtual disk information" 260 onto computer nodes within the storage platform. Preferably, this virtual disk information is replicated and stored on at least three different computer nodes. The metadata module 130 on these three computer nodes handles the storage of this information by placing it into persistent storage as shown in FIGS. 22A and 22B. In one embodiment, a hash function is used upon the virtual disk name 224 in order to produce a hash value which is then used to select three computer nodes within the platform. For example, the virtual disk information for the newly created virtual disk may be stored upon nodes 36, 30 and 40. In this fashion, the virtual disk metadata has been stored upon three metadata nodes within the platform (which might be different from the nodes where the actual data of the virtual disk will be stored). In one embodiment, step 212 stores this information in metadata 862 of metadata module storage as shown in FIG. 22A. As mentioned, this metadata module and its associated storage may be present on any of the computer nodes of the platform. And, it is preferable that virtual disk metadata 862 is replicated upon other metadata modules on other computer nodes.

Next, in step 216 in FIG. 5 the virtual disk that has been created is attached to a virtual machine of the compute farm. In this step, the administrator is aware of which virtual machine on which computer of the compute farm needs the virtual disk. Thus, information regarding the newly created virtual disk (i.e., name, space available, etc.) is sent from the management console routine over link 189 to the appropriate computer within the compute farm. The information is provided to the controller virtual machine 180 which stores the information in cache 181, ready for use when the virtual machine needs to write data. The administrator also supplies the name of the virtual disk to the application that will use it. At this time, no information need be sent from the storage platform or from the CVM to the application.

Figure 23:
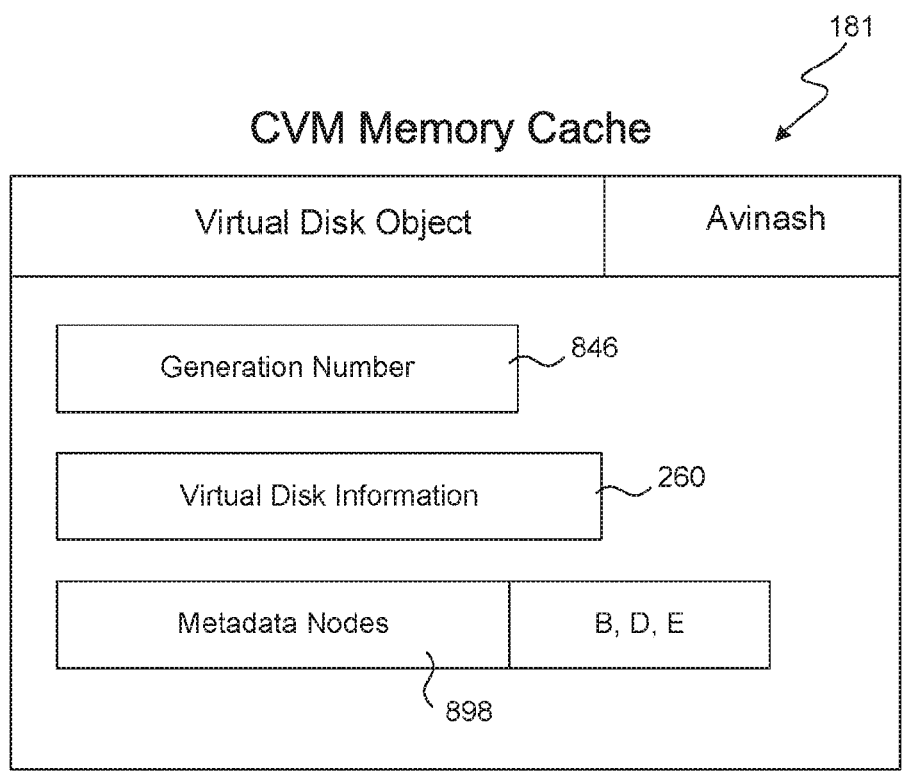
FIG. 23 shows information that may be stored within a memory cache of a controller virtual machine (CVM) on one of the computer servers in the compute farm.

As part of step 216 the virtual disk information which had been stored onto the metadata nodes in step 212 is also sent to the controller virtual machine which caches this information for later use. In addition, the identities of the metadata nodes which store this metadata for the virtual disk is also sent to the controller virtual machine. Thus, the controller virtual machine is aware of on which compute nodes of the storage platform the metadata for a particular virtual disk is stored as shown in FIG. 23. At this point, the virtual disk has been provisioned and is ready for use. Note that the actual nodes and disks within the storage platform have not been allocated yet; such allocation will occur when the virtual machine writes data.

Write to Virtual Disk

Figure 7:
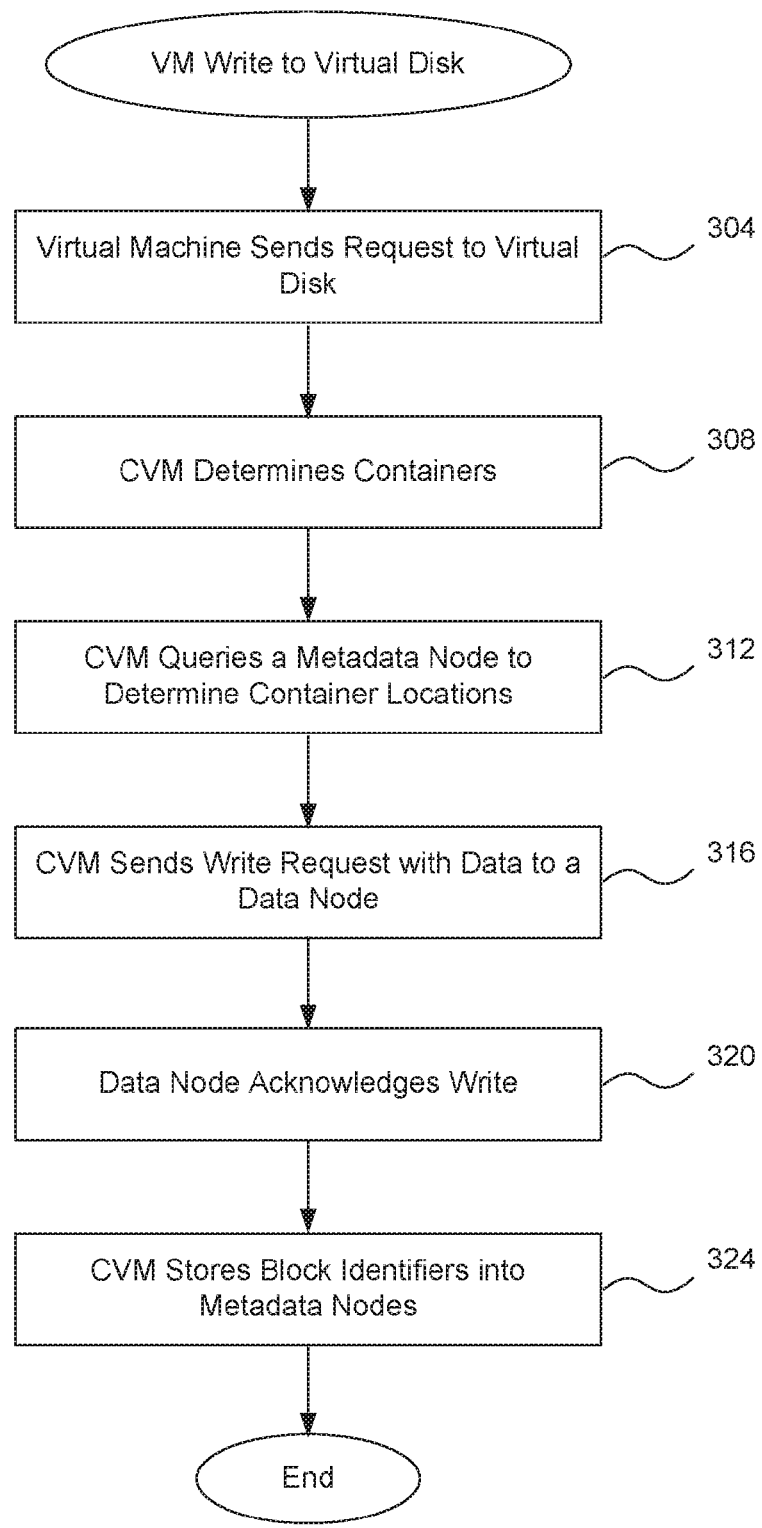
FIG. 7 is a flow diagram describing one embodiment by which a virtual machine writes data to the storage platform.

FIG. 7 is a flow diagram describing one embodiment by which a virtual machine writes data to the storage platform.

Figure 8:
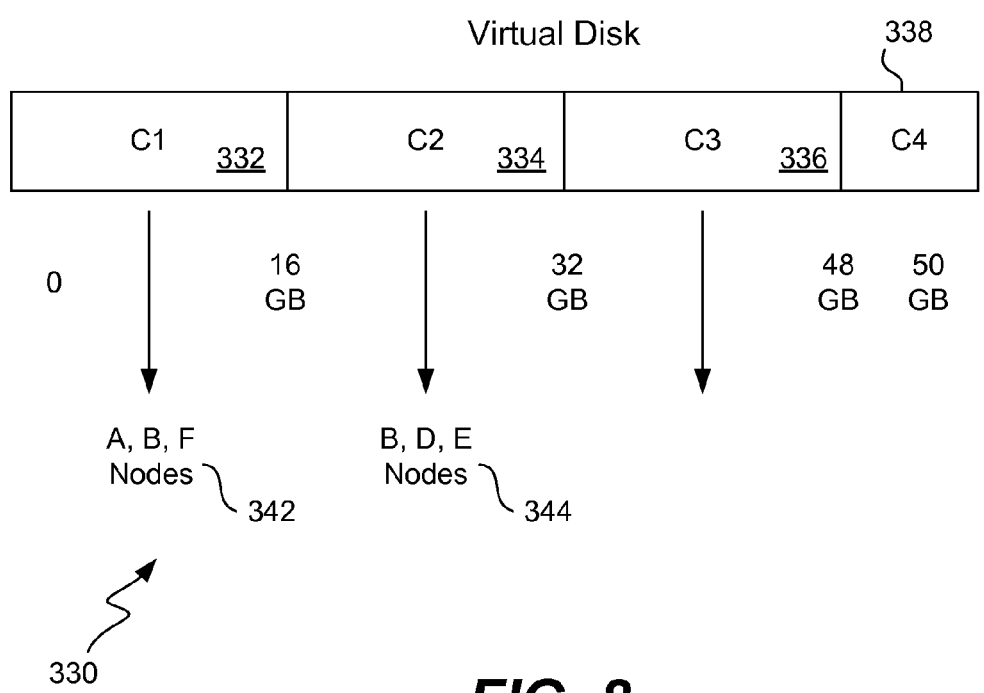
FIG. 8 is a symbolic representation of a virtual disk showing how data within the virtual disk is stored within the storage platform.

FIG. 8 is a symbolic representation of a virtual disk 330 showing how data within the virtual disk is stored within the storage platform and will be referred to in the description of FIG. 7. As shown, the virtual disk has been provisioned as a disk holding up to 50 GB, and the disk has been logically divided into segments or portions of 16 GB each. Each of these portions is termed a "container," and may range in size from about 4 GB up to about 32 GB, although a size of 16 GB works well. As shown, the first portion 332 is referred to as container one, or C1, while the latter portions 334-338 are referred to respectively as containers C2, C3 and C4. Note that the final container may have a size less than the sizes of the other containers. Containers have a particular naming convention. In one implementation, the convention is that the first container of a virtual disk will have a name that is the concatenation of: virtual disk name, "_" and "1." The second container of that virtual disk will have a nearly identical name except that the final symbol will be a "2." In this fashion, by knowing the container name, one knows with which virtual disk the container is associated. In addition, by knowing the virtual disk name, and an offset and size, one will be able to determine the names of the containers associated with a particular write request. In this fashion, each container name is unique within the entire storage platform.

Similar to a traditional hard disk, as data is written to the virtual disk the virtual disk will fill up symbolically from left to right, that is, first filling container C1 and then container C2, etc. Each container of data will be stored upon a particular node or nodes within the storage platform that are chosen during the write process. If no replication is chosen, then data within a particular container will be stored on one node, while if replication is two, for example, then data within that container will be stored upon two nodes. In the example of FIG. 8, the replication factor is three, thus, data stored within container 332 will be stored upon the three nodes A, B and F. Any data stored within the second container 334 will be stored upon the three nodes B, D and E. Note that the set of nodes 342 and 344 might be the same nodes, may be completely different nodes, or may have nodes in common.

It is possible that when a particular file (for example) is written from a virtual machine to a virtual disk on the storage platform the file may be written to two different containers, meaning that the file could potentially be stored upon six different computer nodes if the replication factor is three. For example, if virtual disk 330 already contains 12 GB of data and an 8 GB file is to be written, then this file will span containers one and two because the division between the containers is at 16 GB. Thus, the first 4 GB of file will be written into the nodes designated for container one, while the second 4 GB of the file will be written into the nodes designated for container two. Note that this storage technique using containers is an implementation of the storage platform and is totally transparent to the virtual machines that are storing data. In this fashion, use of the containers spreads the storage of a virtual disk throughout many different computer nodes within the storage platform.

In step 304 in FIG. 7 the virtual machine that desires to write data into the storage platform sends a write request including the data to be written to a particular virtual disk (supplied to the application by the administrator earlier). As mentioned, a write request may originate with any of the virtual machines on one of computer servers 50-52 and may use any of a variety of storage protocols. The write request typically takes the form: write (offset, size, virtual disk name). The parameter "virtual disk name" is the name of the virtual disk originally selected in step 208 in FIG. 5. The parameter "offset" is an offset within the virtual disk (i.e., a value from 0 up to the size of the virtual disk), and the parameter "size" is the size of the data to be written in bytes. As mentioned above, the CVM will trap or capture this write request sent by the application (in the block protocol or NFS protocol).

Next, in step 308 the controller virtual machine determines which containers to use for this request based upon the offset and size parameters. For example, because the CVM is aware of the size of each container (typically 16 GB), knowing the offset and the size of the write request, the CVM is able to determine which container shall be used and whether more than one container is needed. Each container is provided with a unique identifier within the platform, and containers used to write to other virtual disks will also have an identifier unique within the platform. Assuming that only one container is needed (for example, C2), the CVM then proceeds to determine on which computer nodes of the storage platform the data should be stored.

In step 312 the CVM queries a metadata node to determine on which computer nodes the container should be stored. Because the particular metadata nodes on which the metadata for the virtual disk is stored had been previously cached by the CVM, the CVM can easily select one of these metadata nodes to query. The CVM sends a query with the container to be used (e.g., C2) and requests the return of a list of the actual data nodes on which to write that container. If that container had previously been written to that virtual disk then the metadata node knows which data nodes to return because it had previously stored that information. If this is a first write request for a particular container, then the metadata node determines which and how many computer nodes to assign to that container based upon how many replicas are needed. Once the metadata node retrieves or determines the data nodes to use for the write request, it then returns a list to the CVM (e.g., it returns a list of these nodes 344: B, D and E). The CVM is now ready to perform the write request.

In step 316 the CVM then sends the write request (in this case, simply the data itself to be written) to one of the data nodes returned in the previous step (e.g., data node E). The write request also includes an indication of the other two data nodes (B, D) to which the data should be written. The data node that receives the request then writes the data to its disk drives and then forwards the data to the other two nodes. Once each of these nodes writes the data to its disk drives, each of these nodes returns an acknowledgment back to the first data node that had originally received the request from the CVM.

The CVM also sends with the write request the relevant policies for the particular virtual disk. For example, the CVM indicates how many replicas are needed, the type of storage disk required, whether the data should be compressed, what the replication policy is, etc. The data node that receives the request will then handle implementations of all of these policies. The CVM does not need to concern itself with how these policies are implemented; it simply sends the write request with the relevant information.

Also in step 316, because the CVM has a cache 181 that contains the current version and version tree for each virtual disk that is attached to it (i.e., for each virtual disk used by the virtual machines on the same computer as the CVM), the CVM is also able to send the current version of the virtual disk with the write request so that as blocks of the virtual disk are written onto their data nodes the current version may be stored along with each block. Versions and version trees of virtual disks are discussed in more detail below with respect to FIGS. 12-14. A timestamp is also sent with the write request.

In addition to writing the data over an Internet connection to data nodes within a remote storage platform 20, the CVM also writes the same data blocks into solid-state storage 195 in FIG. 4 (a block cache) so that the data blocks may be read from this cache much more quickly if needed. The data blocks are identified within this cache preferably using the block identifiers.

In step 320 this first data node (e.g., E) acknowledges that the write has occurred to the CVM and returns the names of the data nodes (e.g., B, D and E) where the data was written.

In step 324 the CVM then calculates the block identifiers (i.e., blocks 1, 2, 3) within the virtual disk where the data has been stored and then saves this information into the metadata nodes associated with the virtual disk. As is known in the art, disks are typically divided up into blocks (usually blocks of 4K) and data is written to, and read from, disks using blocks. Because the CVM is aware of the offset for the write request, the CVM then knows the block identifier for the first block to be written for the current write request. And, because the size of the write request is also known, the CVM is then able to easily calculate onto which data nodes blocks of data were written, and the corresponding block identifiers for those blocks of data. In the current example, the CVM calculates the block identifiers for those blocks of data in the current write request which were written to nodes B, D and E. Even if a write request spans two different containers, by simple calculation using the container size, offset, and size of the write request, the CVM will be able to determine which block identifiers were written to the first container and which block identifiers were written to the second container.

The CVM then stores these block identifiers where the current write was successful into the three metadata nodes holding the metadata for the current virtual disk as shown in FIG. 22B. Thus, these three metadata nodes are always aware which block identifiers have been written for this particular virtual disk. Of course, other virtual disks that have been created within the storage platform may use different sets of three metadata nodes (or perhaps fewer or more metadata nodes) in order to store their metadata.

In step 324 the locations of the containers (nodes and storage pools) are also written into the metadata modules associated with that virtual disk.

In step 324 the CVM also sends the current version of the virtual disk with the block identifiers so that the current version may be stored along with the block identifiers in the metadata nodes as shown in FIG. 22B in columns 882, 884, etc. (e.g., "Version" of "CH1$Version").

In addition, the CVM also generates a timestamp and includes this timestamp along with the block identifiers so that each block includes a timestamp in metadata. As known in the art, a timestamp may be generated in a variety of manners. In one preferred embodiment, a timestamp is generated as discussed below with respect to FIGS. 19 and 20.

Preferably, write operations do not overwrite older versions of data. In this fashion, earlier versions of data in a virtual disk are always available to be read. Thus, snapshot and revert operations can be performed very quickly because data does not need to be copied into special storage locations or retrieved from special storage locations. All versions of data are always available within the storage platform. As shown in FIG. 22B, blocks of data are stored as "chunks," each chunk including in its name the version number which identifies the version of the data stored.

Read from Virtual Disk

Figure 9:
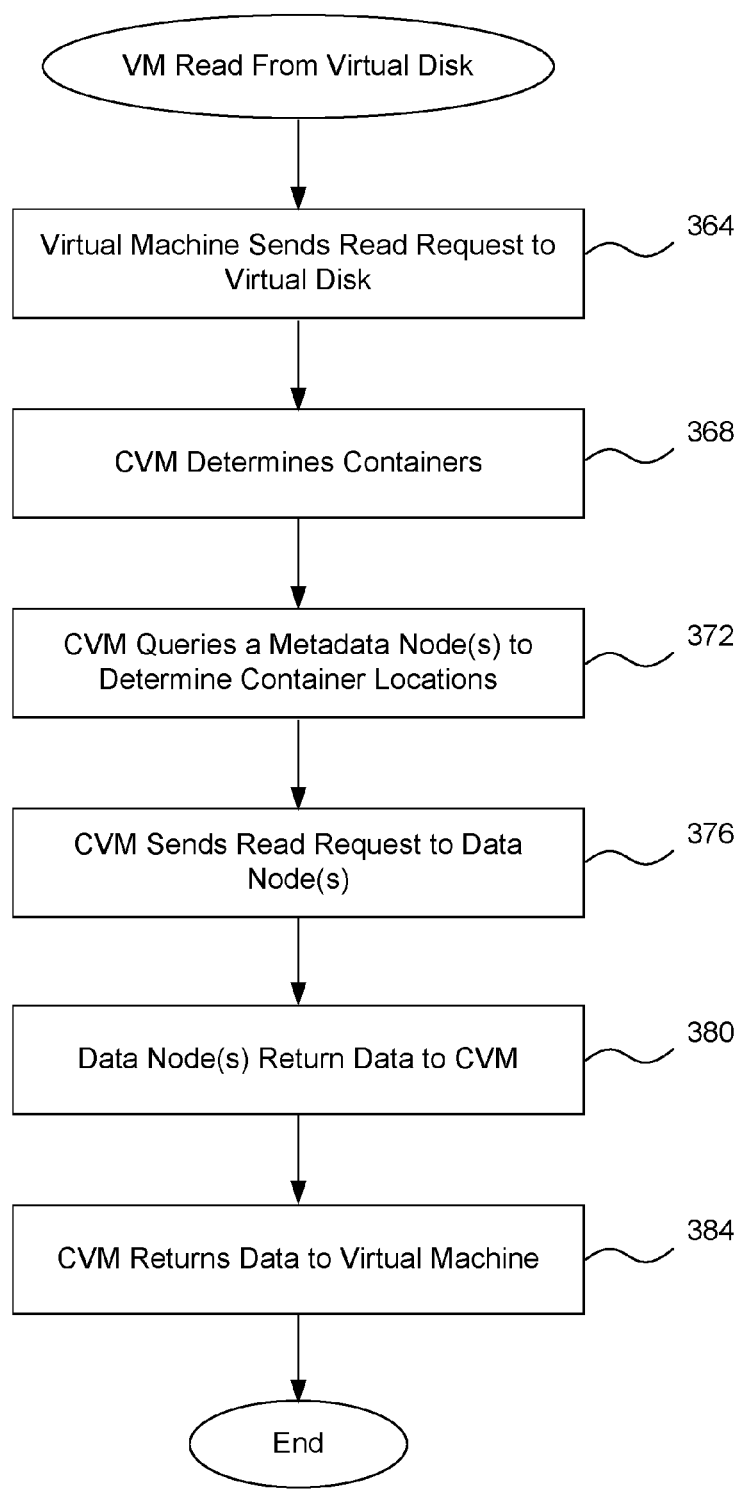
FIG. 9 is a flow diagram describing one embodiment by which a virtual machine reads data from the storage platform.

FIG. 9 is a flow diagram describing one embodiment by which a virtual machine reads data from the storage platform.

In step 364 the virtual machine that desires to read data from the storage platform sends a read request from a particular application to the desired virtual disk. As explained above, the controller virtual machine will then trap or capture the request (depending upon whether it is a block request or an NFS request) and then places a request into its own protocol before sending a request to the storage platform.

As mentioned, a read request may originate with any of the virtual machines on computer 51 (for example) and may use any of a variety of storage protocols. The read request typically takes the form: read (offset, size, virtual disk name). The parameter "virtual disk name" is the name of a virtual disk on the storage platform. The parameter "offset" is an offset within the virtual disk (i.e., a value from 0 up to the size of the virtual disk), and the parameter "size" is the size of the data to be read in bytes.

In one embodiment, the CVM first checks its block cache 195 to determine whether any of the blocks to be read are already present within this cache. If so, these blocks are retrieved from block cache 195 instead of having to establish a remote connection with storage platform 20 and retrieve those blocks remotely which would take a greater deal of time.

Next, in step 368 the controller virtual machine determines which container or containers to read from for this request based upon the offset and size parameters as described above. The CVM also determines the block identifiers that it needs to read using the offset and the size from the request.

In step 372 the CVM queries a metadata node to determine on which computer nodes the data blocks identified by the block identifiers are written. Because the particular metadata nodes on which the metadata for the virtual disk is stored had been previously cached by the CVM, the CVM can easily select one of these metadata nodes to query. The CVM sends a query with a container identifier (e.g., C2) and requests the return of a list of the actual computer nodes on which the data had been written. The metadata node knows which data nodes to return because it had previously stored that information in step 324 (FIG. 7); see, for example, FIG. 23. Once the metadata node retrieves the data nodes where the data blocks were stored, it then returns a list to the CVM (e.g., it returns a list of these nodes 344: B, D and E). The CVM is now ready to perform the read request.

In step 376 the CVM then sends the read request to each of the data nodes returned in the previous step. The read request includes a list of block identifiers to be read and a timestamp. In one embodiment, a timestamp with a read request is useful for the following reasons. As mentioned above, performing a write request for a particular container to any number of data nodes may result in success or failure. If the result indicates failure, then the CVM will not update the relevant metadata nodes to indicate that the write was actually performed. Nonetheless, it is possible that the data might have been written to at least one data node within the storage platform. Upon a subsequent read operation of that same container, is important not to read the information that might have been written to a node during the failed write operation. It is important to read information for that container from a previous successful write operation. Thus, the read request will include a timestamp from the previous successful write operation in order to avoid reading the wrong data. Because every successful write operation records the timestamp of that successful write operation into the relevant metadata nodes, the CVM can obtain this timestamp for the last successful write operation in step 372.

The CVM sends along with the read request all version numbers for the data that it is requesting along with the version tree. How to obtain these version numbers is discussed in more detail below with respect to FIG. 12. The version number is useful because the particular read request will need to read from the current version using the version tree, backtracking to the root of the tree as explained below. This technique provides the requesting application with the correct version from the virtual disk.

In step 380 each data node returns the data identified by the block identifiers to the CVM. In step 384 the CVM then returns this data to the requesting virtual machine using the appropriate protocol 183 or 187, again masquerading either as a block device or as an NFS device depending upon the protocol used by the particular application.

Alternatively, the read request is sent to only one of the data nodes (e.g., B) and also includes an indication of the other two data nodes (D, E) from which the data should be read. The first data node then passes the read request to each of the other data nodes. Each of these data nodes that receives the request then reads the data from its disk drives. Once each of these nodes reads the data from its disk drives, each of these nodes returns the data back to the first data node that had originally received the request from the CVM. This first data node then returns the data to the CVM.

Storage Pool Migration

In the field of data storage, disk failure and the reconstruction of the lost data is a problem to be addressed. In the past, a redundant array of independent disks (RAID) has been used to address this problem. Currently, however, disks are becoming extremely dense but are not necessarily becoming relatively faster. For example, a single disk may now store up to 4 TB of data; if this disk were to fail, it can take hours to reconstruct all of the lost data from other disks. During the reconstruction the server application that relies upon those disks will be degraded, and, should another disk fail, the storage infrastructure can be continuously attempting to reconstruct data and the application will be further degraded.

In order to address the above problem, a storage pool migration technique is disclosed that allows many, if not all, of the computer nodes within a storage platform to participate in the data reconstruction, thus leading to faster recovery. In addition, when data from a failed disk is reconstructed at a different location the data will be reconstructed using all of the relevant policies of the virtual disk from which that data is a part. Lost data from a failed disk is reconstructed quickly and applications that rely upon the storage platform are not degraded.

Figure 10:
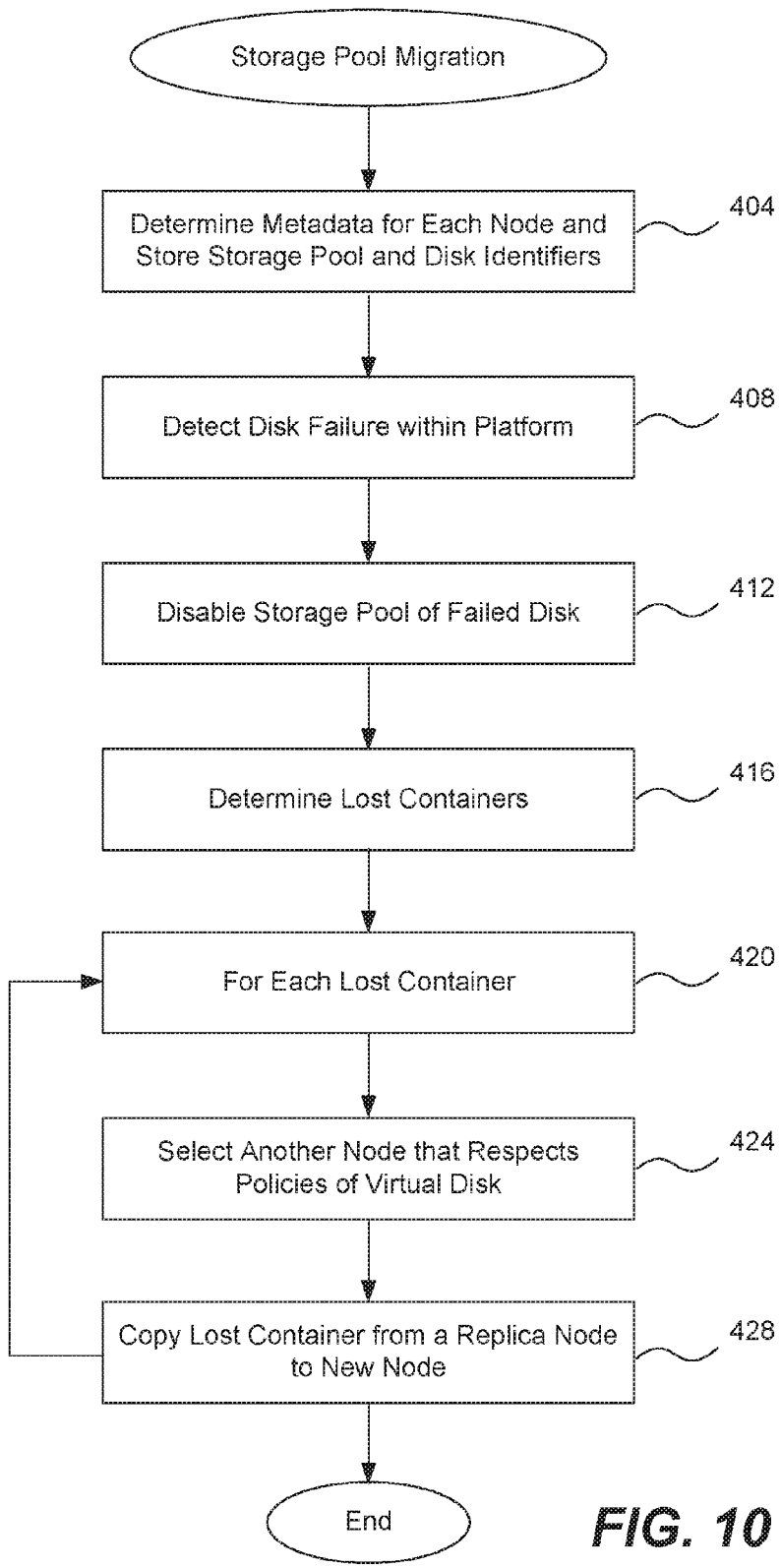
FIG. 10 is a flow diagram describing one embodiment by which failure recovery is performed.

FIG. 10 is a flow diagram describing one embodiment by which this failure recovery is performed.

Figure 11:
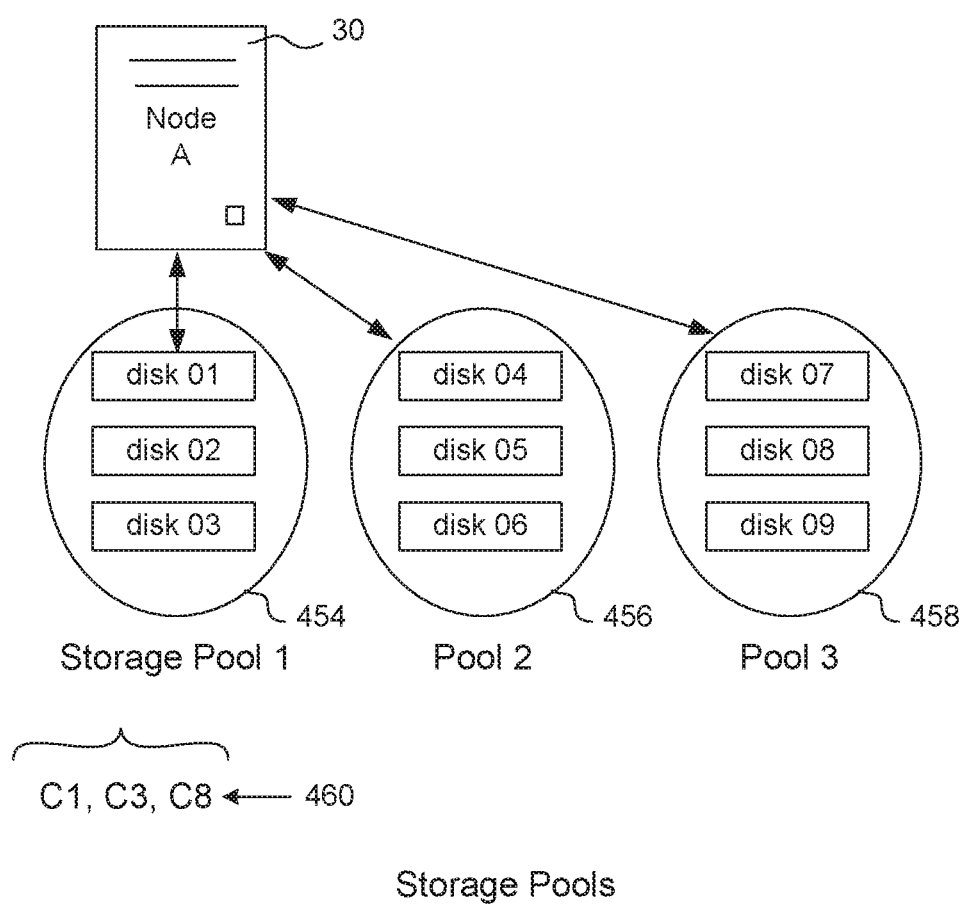
FIG. 11 illustrates how disks within the storage platform are organized into storage pools.

FIG. 11 illustrates how disks within the storage platform are organized into storage pools and will be discussed in the context of the flow diagram of FIG. 10. Shown is one computer node 30 of the storage platform having a unique identifier "A." Associated with, and under the control of, each computer node are any number of hard drives or solid-state disks. Shown are nine disks that are organized into groups of three, each group forming a storage pool 454, 456 or 458. Of course, more or fewer disks may be associated with each node, there may be more or fewer storage pools, and the number of disks within each storage pool may vary. Each storage pool within the platform also has a unique identifier such as "storage pool 1," etc. As earlier discussed, when an application writes data to its virtual disk that data will be assigned to a particular container and that container will be written to a particular node or nodes (as shown in FIG. 8).

As shown in FIG. 11, containers written to a particular disk will necessarily be assigned to a particular storage pool. In this example, containers C1, C3 and C8 have previously been written into a disk or disks within storage pool 454. Various implementations may be used to write a container into a storage pool. One technique simply writes a particular container onto a single disk within the storage pool. In a preferred technique, a given container is written to a storage pool by spreading the blocks of a container across all of the disks within that storage pool. Of course, other techniques used to write blocks of data onto a disk or disks may also be used.

FIGS. 22A and 22B illustrate persistent storage of a metadata module 130 executing upon a particular computer node within the platform. As mentioned before, each computer node includes an executing metadata module each storing metadata concerning nodes, virtual disks, etc. For example, persistent storage for node A (for example) includes metadata 862 concerning the virtual disk named "Avinash." Of course, other metadata may also be stored within this storage. The contents of this persistent storage will be discussed in more detail below.

Referring again to FIG. 10, in step 404 the metadata for each computer node within the storage platform are determined at any suitable time. In other words, a computer node such as node "A" will have its metadata stored on at least one computer node within the platform, and preferably three. This metadata will be stored using the metadata module executing upon each node and stored within persistent storage associated with each metadata module. The metadata nodes for a particular computer node are determined by using a hash function on the unique identifier for a particular node to produce a hash value. This hash value is then used to identify three computer nodes within the platform that will be the metadata nodes for that particular node.

In this example, FIG. 22A shows that metadata module persistent storage stores metadata on computer node "A." Step 404 also includes storing the storage pool identifiers and the disk identifiers for each node into the metadata module storage. As shown in FIG. 22A, metadata 860 includes the unique identifiers of the storage pools (e.g., "SP1") associated with node "A" as well as the unique identifiers for each disk (e.g., "D1"), and in which storage pool each disk belongs. Metadata 861 also includes container information showing which containers are stored within each storage pool; in this example, container ViS2 is stored in storage pool SP3.

Step 404 is performed for each computer node within the platform and may be performed at any suitable point in time, preferably when the platform is first initialized, or when containers are written.

In step 408 at some point in time the failure of a disk is detected within the platform. This failure may be detected in many ways. When a disk fails, it is assumed that the data present on that disk is lost and that the data should then be reconstructed as there may not be enough replicas of the data according to the replication factor of the virtual disk of which the data was a part.

In step 412 the storage pool that includes the failed disk is disabled. For example, assuming that disk D2 has failed, then the module will disable storage pool 454 because disk D2 is part of that storage pool. In this embodiment, the entire storage pool is disabled rather than simply disabling the failed disk. Disabling a storage pool means that no more data will be written to any of the disks within that pool and that no more reads will be performed from that pool. Preferably, the data modules 120 are responsible for performing storage pool migration.

In step 416 the module determines which containers are present on the disabled storage pool and therefore, which containers must be reconstructed. Because it is known which particular disk has failed and which storage pool has been disabled, the module may then reference metadata 861 (for example) to determine which containers have been lost. For example, knowing that disk D2 has failed on computer node "A" the module finds the metadata module storage for node "A" and determines that containers C1, C3 and C8 have been lost. As shown in FIG. 11, containers 460 have unique identifiers within the storage platform and these containers may be part of any of the virtual disks stored within platform. In other words, containers C1, C3 and C8 may be part of different virtual disks, or, they may all be part of the same virtual disk.

Step 420 begins a loop that iterates over each of the lost containers using the unique identifier for each lost container. In step 424 a candidate computer node within the storage platform is selected to hold a new replica of the lost container that respects the policies of the virtual disk that includes the lost container. For example, given the unique identifier of a lost container, the module then references metadata 862 to determine the relevant policies of that virtual disk that must be complied with. Because the container identifier includes the virtual disk name, the module then knows the virtual disk name and can find its virtual disk information on the appropriate metadata node. In this example, the candidate node must comply with the Replication policy and the Residence policy of virtual disk Avinash.

For example, if the Replication policy states that each of the three replicas of the virtual disk must be stored in a geographically separate data center ("data center aware"), this means that the candidate node must not be located in a data center where the remaining two replicas are located. If the Replication policy states that replicas must be stored in different racks ("rack aware"), this means that the candidate node must not be located in a rack where the remaining two replicas are located. If the Replication policy states that at least one replica must be located in public cloud storage ("hybrid cloud aware"), this means that the candidate node must be located in public cloud storage if one of the other replicas is not already located there. Complying with the Residence policy means that the candidate node must have disks of a type specified in the Residence policy, i.e., hard disks or solid-state disks on which the entire container can be stored. Of course, there may be other policies that must also be complied with. The information that describes the Replication and Residence characteristics of each node (among others) may be found by querying each node, by looking at the metadata for a particular node, or using other suitable techniques.

Once another computer node has been selected (after reviewing any number of candidate nodes) that respects the policies of the virtual disk to which the lost container belongs, then in step 428 the lost container is copied from one of its remaining replicas onto the selected node. For example, if it is known that computer nodes "B" and "C" hold replicas of the lost container, then one of these replicas may be used to copy a new replica onto the selected node. If node A respects the policies then it may be used as the selected node even though it is the node where the disk just failed, i.e., another storage pool on node A may be selected even though a storage pool on node A just failed. In an alternative embodiment, no storage pool on node A may be used as it may be unclear why one of the storage pools failed.

Finally, because a new replica of the container now exists on a new node and on a new disk, the metadata module storage corresponding to that computer node is now updated with the new information. For example, if container C1 has now been written to node "D" then the metadata module storage associated with node "D" is then updated to reflect that container C1 is now present within a particular storage pool of that node.

Virtual Disk Snapshot

As known in the art, taking a "snapshot" of a file, database or disk at a particular point in time means saving the existing state of that data so that it may be referenced at a later point in time, even after changes have been made to the disk after the snapshot was taken. Primarily used for data protection, snapshots may be used in the development of a particular software application. If the application (and its data) are executing successfully at a particular point in time, a snapshot of the software application and of its data at that time may be taken before any new features are added, before a new version is introduced, before the data is changed, or before other changes occur that might corrupt the data. If corruption of the data (or of the application) occurs, then one simply reverts to the snapshot of that data before the corruption occurred. Typically, though, taking a snapshot or reverting is dependent upon the amount of data that is being protected. If a snapshot or revert command needs to copy all of the data from one location to another, this can be very time-consuming (and error prone) if the size of the data is large. Even if copying only involves recent changes (or "deltas") to the data, this can be time consuming.

This embodiment of the present invention provides techniques for creating a snapshot of a virtual disk (recording a version of that disk at a particular point in time) and for reverting to that earlier version of the virtual disk (the snapshot) that is not dependent upon the size of the virtual disk or the amount of data it contains. No data of the virtual disk needs to be copied during either the snapshot command or the revert command. The result is data protection that is simple, fast and inexpensive. The data of the virtual disk may be data of an application, source or object code of the application, etc.

In order to avoid overwriting a block of data having a version 1 with a different block of data having a version 2, an implementation may be used such as shown in FIG. 22B, in which blocks (or chunks) of data having different versions are stored in different locations, i.e., particular versions of particular blocks are not overwritten within the platform.

Figure 12:
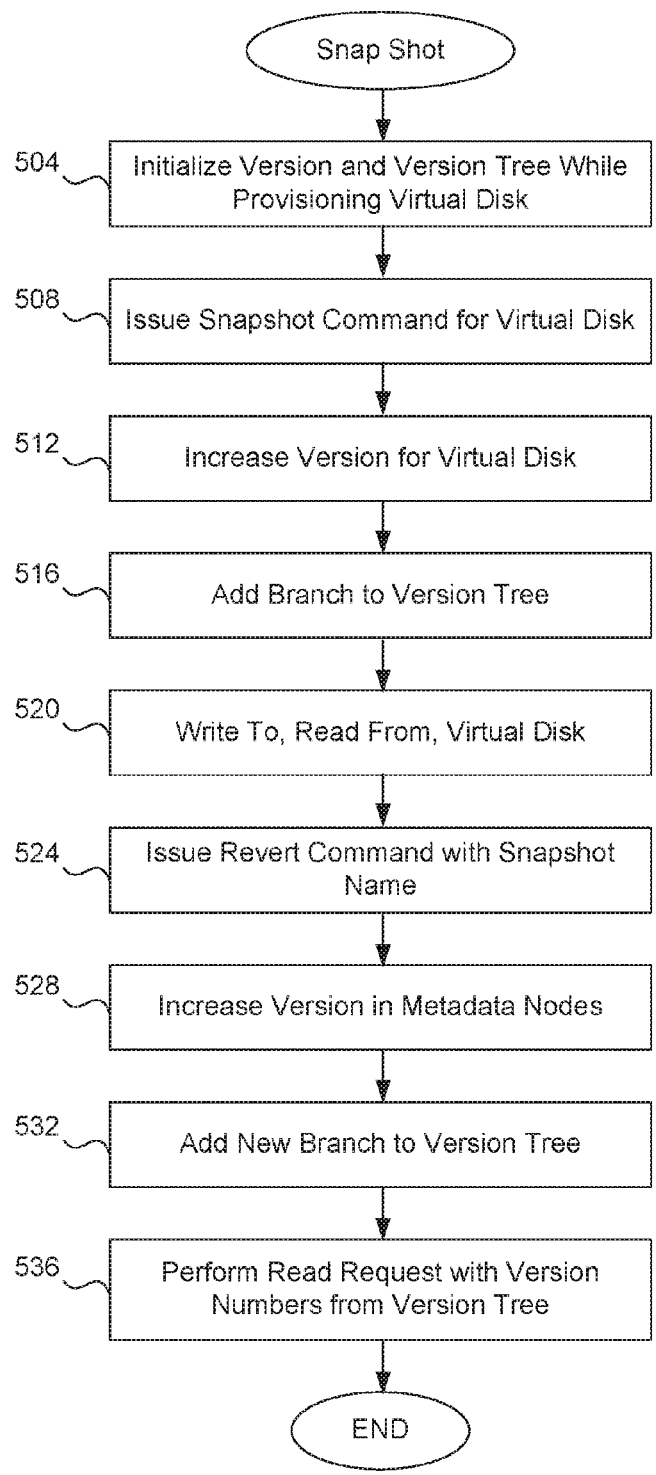
FIG. 12 is a flow diagram describing an embodiment in which a read is performed of the virtual disk in the context of Snapshot and Revert commands.

FIG. 12 is a flow diagram describing an embodiment in which a read is performed of the virtual disk in the context of Snapshot and Revert commands.

Figure 13:
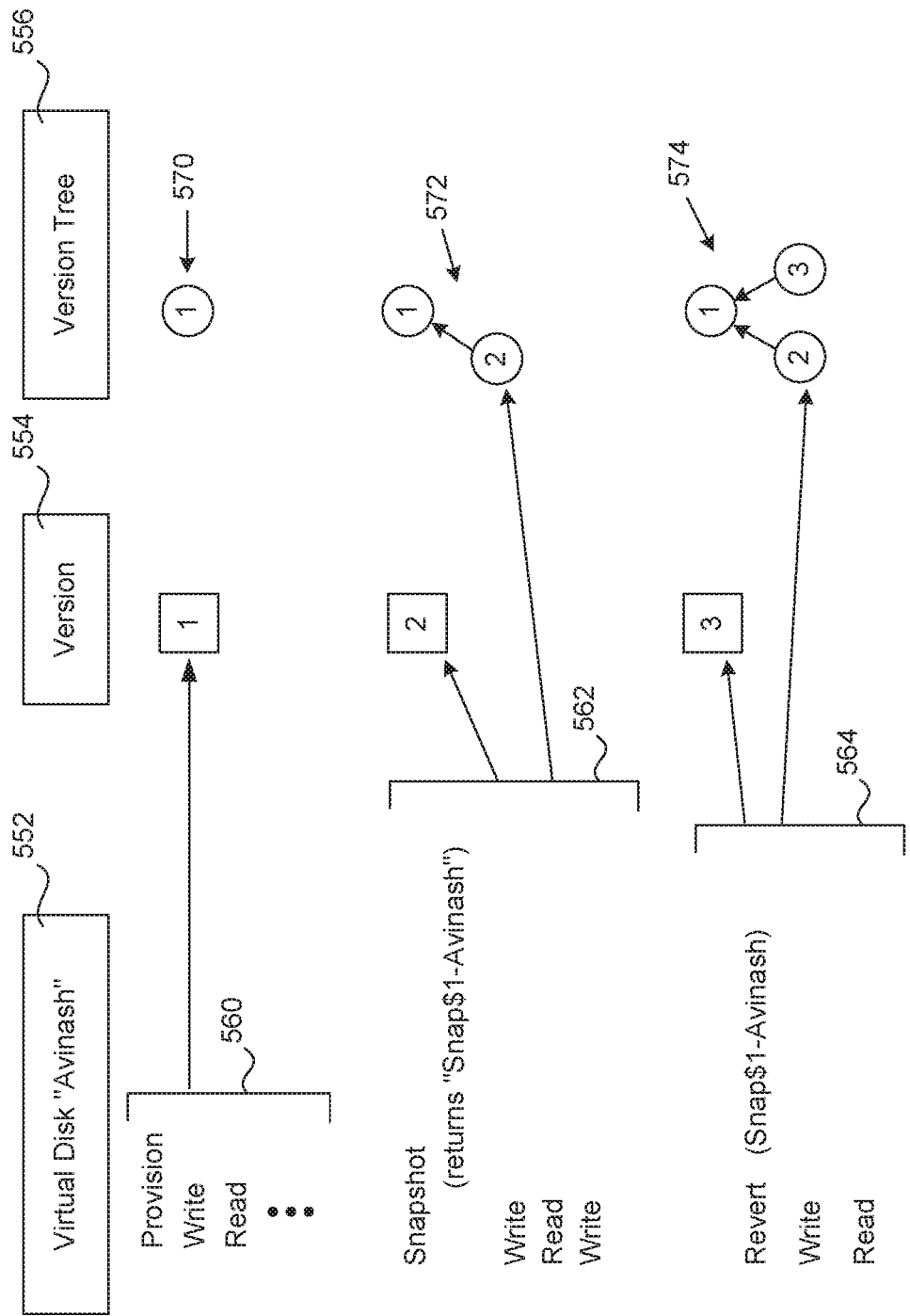
FIG. 13 is an illustration of how state variables version and version tree are updated during the course of commands concerning the virtual disk.

FIG. 13 is an illustration of how state variables version 554 and version tree 556 are updated during the course of commands concerning virtual disk 552. This figure will be discussed in greater detail below in the context of the steps of FIG. 12.

In step 504, while a particular virtual disk is being provisioned, its version number and version tree are initialized. This initialization may be performed during step 212 (FIG. 5) and involves updating metadata 862 (for this particular virtual disk, for example) so that the version is set equal to "1" and the version tree data structure includes only the root, also with the value of "1." Further, in step 216 (again see FIG. 5) the version and version tree are also stored into cache 181 (FIG. 4) of the controller virtual machine along with the rest of the virtual disk information.

A symbolic representation of commands given to this virtual disk and of how the values for its version and version tree change as these commands are given are shown in FIG. 13. Shown symbolically is a particular virtual disk 552 and listed below it vertically are a sequence of Snapshot and Revert commands issued to this virtual disk. Version 554 shows how the version changes as these commands are given, and Version tree 556 shows how the version tree data structure changes as well. As shown at state 560, once the virtual disk has been provisioned it has a version equal to "1" and its version tree is simply the root 570. Any number of write requests and read requests (and other commands) may be issued to the virtual disk yet the virtual disk remains in state 560 in which its version is "1" and its version tree is root 570.

At a particular point in time, an application developer, administrator, or other entity that controls the virtual disk may desire to issue a Snapshot command for that virtual disk. Such a situation may occur before new features are introduced into the application, before an operating system update, before a new version of the application is introduced, before data is changed, etc. In any case, the administrator desires to save the exact state of the data currently present on the virtual disk so that it may be retrieved and used at a later point in time. Accordingly, in step 508 a Snapshot command is issued for the virtual disk and may be issued using the management console or a command line interface. The Snapshot command takes one parameter which is the name of the virtual disk. This command causes the version for that virtual disk to increase in step 512 and also causes a branch to be added to the version tree in step 516. FIG. 13 illustrates these changes caused by issuance of the Snapshot command. As shown in virtual disk (column) 552 the virtual disk enters into a new state 562 in which the version is changed to "2" and the version tree has a new node "2" added with a link back to the root "1" as shown at updated version tree 572.

Issuance of the Snapshot command returns the name of the Snapshot which includes the version at the time the command was issued (i.e., before the version is increased) and the name of the virtual disk. For example, the Snapshot command returns a Snapshot name which is "Snap$1—Avinash." Other descriptive information may also be added by the administrator when issuing the Snapshot command and would become part of the Snapshot name.

These changes are then stored in the metadata for the virtual disk in question, in this example, stored into metadata 862 (FIG. 22A) of a metadata module on the computer nodes that are responsible for the metadata of that particular virtual disk. In addition, the version and version tree are also sent to the controller virtual machine to which the virtual disk is attached so that the cache of the CVM will always be up to date.

The upshot of increasing the version by one is that any write requests performed for this virtual disk after the Snapshot command has been issued will be written with the new version, namely "2." The updated version tree 572 indicates symbolically that version "2" is based upon version "1." Of course, this version tree may be implemented in the memory of the metadata module storage and in the cache of the CVM using any appropriate data structure. In step 520 (FIG. 12), commands may be issued to the virtual disk such as write requests and read requests, and these commands will take place in the context of state 562, namely that the current version of the virtual disk is version "2."

At some future point in time the administrator may wish to revert to an earlier state (or version) of the virtual disk. In this simple example, only a single snapshot exists that was created when the virtual disk was in version "1," and the name of that snapshot is "Snap$1—Avinash." Responsibility for remembering when particular snapshots were created, and the context of the snapshots within the development of a particular software application, rests with the administrator or others. Any of a variety of schemes may be used for recording snapshot names, particular version numbers, relevant events, etc. Because a snapshot name includes its version number and the name of the virtual disk, it can be a simple matter to decide which snapshot to use when a particular earlier version is desired.

Accordingly, in step 524 an administrator issues a Revert command that includes a particular snapshot name, for example, "Revert Snap$1—Avinash." In this example, the virtual disk now enters state 564, the version is changed to "3" in step 528, and the version in the metadata nodes tree has a new branch added in step 532 so that it appears as shown in version tree 574. From this point forward, any write requests will be in the context of version "3." As shown in the new version tree 574, when a Revert command is given a new branch is added having the new version number "3," the branch has a reference back to the version that was in place for the snapshot desired. In this example, because the virtual disk reverts to a snapshot created when the version was "1," branch "3" of the version tree points back to branch "1," which in this case is the root. When a Revert command is issued the version is also incremented by one because even though the virtual disk reverts to its last known state in version "1," other changes may occur, hence, a new version is indicated. Thus, after the Revert command has been issued the version of the virtual disk is version "3" and other write requests take place in the context of this version. A read request will also include the current version so that the current version of the data is always read. A write request will also include the current version number.

In step 536, a read request is performed in the context of version numbers from the version tree. When an application on a virtual machine requests to read from a virtual disk the flow will occur as described in FIG. 9 except that the CVM will provide a version number along with the read request in step 376. In step 376 before the CVM sends the read request to the data nodes it will first access the version tree data structure for the particular virtual disk stored within its cache (or optionally may retrieve this data structure in step 372 from the metadata node). The CVM will start at the current version (in this case, version "3") and then walk through the existing links all the way back to the root, collecting version numbers as it goes. In this case, the CVM collects versions "3" and "1". When the read request is then sent in step 376 these collected version numbers are also sent. When each data node then attempts to read particular blocks of data from one of its disks, it will only read blocks having versions "3" or "1". Data blocks having other versions will be ignored because these blocks do not correspond to the current version that the application wishes to read after issuing the Revert command.

Figure 14:
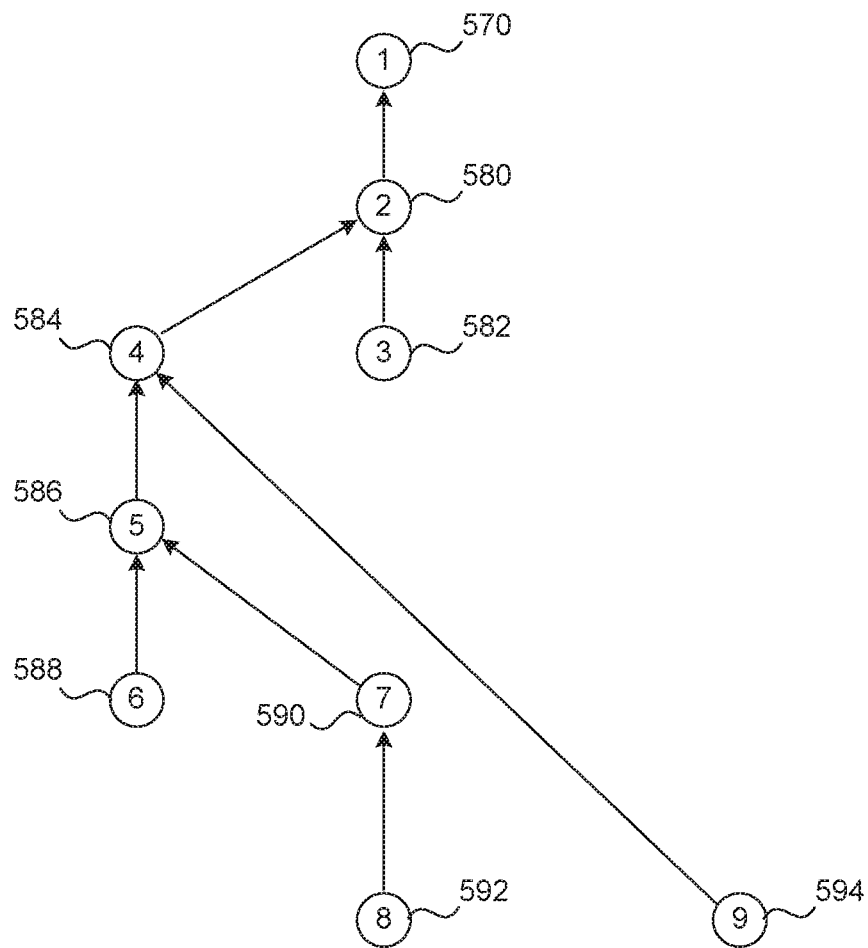
FIG. 14 illustrates a more complex version tree for a particular virtual disk.

FIG. 14 illustrates a more complex version tree for a particular virtual disk. When the disk is first provisioned its version is "1," the version tree is simply the root as shown at 570, and any I/O handling occurs in the context of this version. At some point, the administrator issues a Snapshot command while in version 1; the version of the virtual disk is incremented to "2" and the version tree now appears as shown at 580. At some future time the administrator issues another Snapshot command while in version 2; the version is incremented to "3" and the version tree now appears as shown at 582. At some future time the administrator issues a Revert command back to version "2" while in version "3;" the version is incremented to "4" and the version tree now appears as shown at 584. Branch "4" references back to branch "2" because the Revert command wanted to revert back to version "2."

At some point, the administrator issues a Snapshot command while in version "4;" the version of the virtual disk is incremented to "5" and the version tree appears as shown at 586. At some future time the administrator issues another Snapshot command while in version 5; the version is incremented to "6" and the version tree then appears as shown at 588. At this point in time, the version tree includes all branches or versions 1-6; branches or versions 7-9 are yet to be added.

Next, while in version "6," the administrator issues a Revert command back to version "5"; the version is incremented to "7" and the version tree then appears as shown at 590. Another Snapshot command is issued while in version "7;" the version is incremented to "8" and the version tree now appears as shown at 592. While in version "8" the administrator desires to revert back to version 4. After the Revert command is given, the version is incremented to "9" and the version tree now appears as shown at 594 with a link from branch or version 9 returning to branch or version 4. Once in version "9," any read request will include the version numbers 9, 4, 2 and 1, as these are the version numbers found in the version tree as the CVM walks back through the tree from the current version to the root.

Thus, Snapshot and Revert commands may be executed that do not depend upon the amount of data in the virtual disk; these commands may be executed within milliseconds as the only two operations needed are the updating of the version and the updating of the version tree. Because older versions of data blocks are always saved and not overwritten, these older versions are always available and data need not be copied or saved when a snapshot command is given. Likewise, when a revert command is given, data need not be copied from a special storage location back into the virtual disk because all versions of all data stored are always present within the platform.

Clone a Virtual Disk

Figure 15:
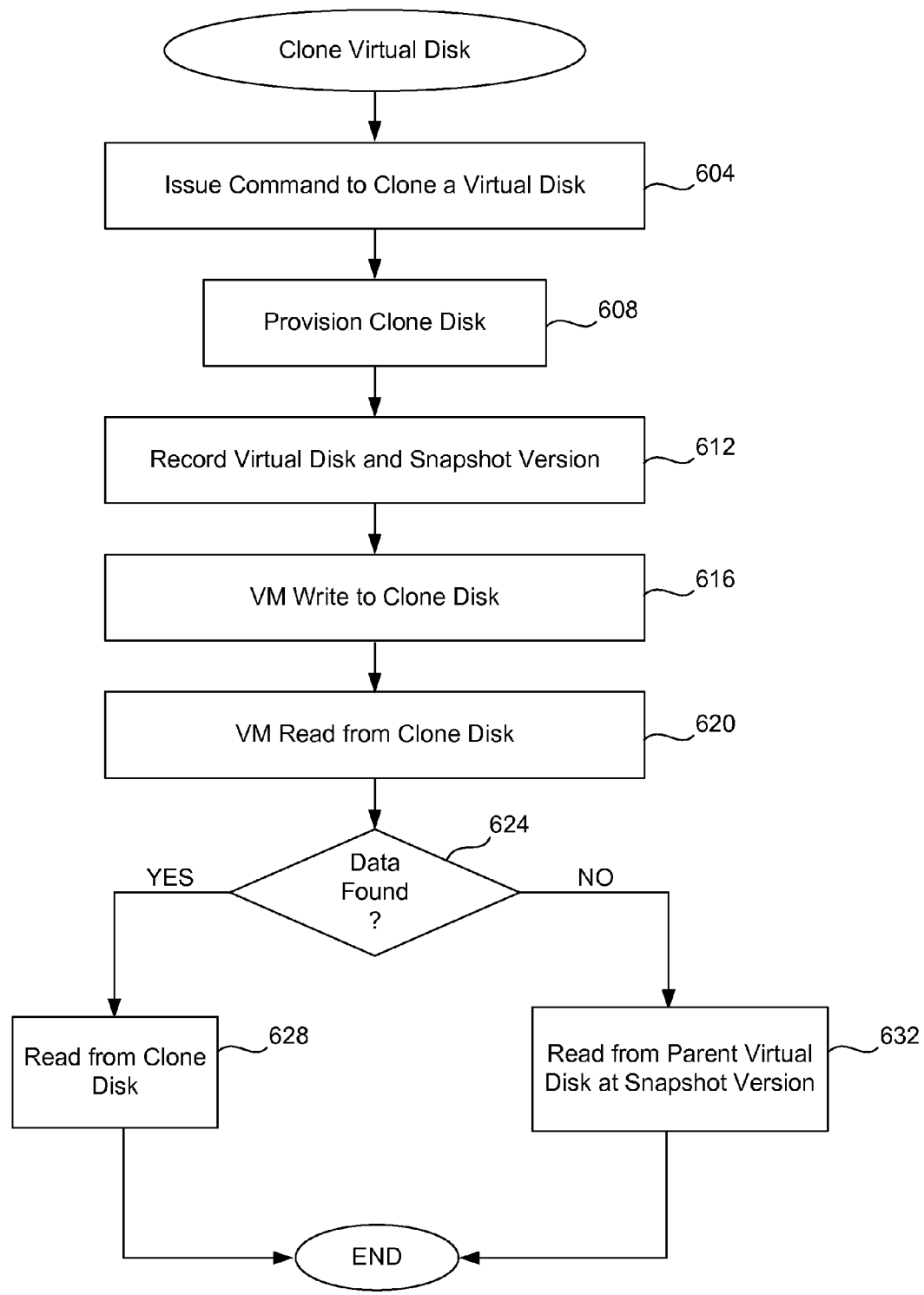
FIG. 15 is a flow diagram describing an embodiment for cloning a virtual disk.

FIG. 15 is a flow diagram describing an embodiment for cloning a virtual disk. Advantageously, this embodiment provides a technique by which the clone of a virtual disk may be created with all of the same parameters and policies of the parent virtual disk, or, entirely new and different parameters and policies may be provided for the same data. For example, a clone of a virtual disk may specify different media on which the data of the clone should be stored (e.g., solid-state drives instead of hard disk drives), may specify different physical locations for the data (e.g., a data center aware policy instead of an agnostic policy), etc.

These different policies are implemented when new data is written to the clone disk. For example, if the parent virtual disk is all stored on hard disk drives, when the clone virtual disk is created all of its information by default will all be stored on hard disk drives as well, even if the clone virtual disk specifies solid-state drives. If only read operations are performed, the reads will always be from hard disk drives. Data will be written to solid-state drives as specified by the clone virtual disk when writes occur. The same holds true for the data center and rack aware policies as well. Thus, the different policies are implemented when data is written to the clone disk. As mentioned earlier, a write request includes the policies for a virtual disk (from the CVM cache) to ensure that data is written to a virtual disk using the correct policies.

One example of when it would be useful to clone a virtual disk involves testing an application. Consider a production system having a database existing within the storage platform on solid-state drives. If a developer wants to test new features of the application it will be desirable to have a test database that looks and feels very similar to the production database. This embodiment of the invention is able to take a snapshot of the production database on the virtual disk, make a clone of that virtual disk, and store changes to the database onto hard drives instead of onto the solid-state drives. Thus, the test database and any changes to it will reside on media that is less expensive than solid-state drives.

In step 604 an administrator desires to create a copy of a virtual disk within the storage platform and issues a command to clone the virtual disk. The clone command may be given from the management console and typically takes the form "Clone—virtual disk name—snapshot name—metadata properties." The "virtual disk name" is the name of the virtual disk to be copied and is known as the parent virtual disk. The "snapshot name" is the name of a particular snapshot that has been created for the parent virtual disk and is explained in more detail with respect to step 508 in FIG. 12. In particular, note that a snapshot of a virtual disk is created when the virtual disk is in the context of the current version; this current version becomes part of the snapshot name that the module returns to the administrator. For example, referring back to FIG. 14, if the administrator creates a snapshot of this virtual disk while in version "5" then the name of the snapshot will be returned and will include the numeral "5" within its name. Accordingly, any clone virtual disk created from a parent virtual disk using snapshot "5" will include all of the information included in that parent virtual disk up to and including version "5."

The parameter "metadata properties" allows the administrator to specify any of the parameters and policies shown in FIG. 6, for example, and includes any other parameters or policies that can be specified when adding a new virtual disk. For example, the command in step 604 may specify that the clone virtual disk must use compression, that its data should be stored upon solid-state drives, that its replication factor should be five, that its replication policy should be hybrid cloud data center aware, etc. These parameters and policies may be different from that of the parent virtual disk or they may be the same.

In step 608 the clone virtual disk is provisioned as is any new virtual disk according to steps 212 and 216 (FIG. 5) including providing the clone disk with its own unique name. For example, three metadata nodes will be chosen for this clone virtual disk and its clone virtual disk information will be stored in storage of these metadata nodes such as is shown at metadata 862 (FIG. 22A). In addition, the clone virtual disk will be attached to the same virtual machine as the parent virtual disk. Alternatively, the clone virtual disk may also be attached to a different virtual machine on a different computer on direction by an administrator.

The clone virtual disk also receives its own version ("1" to begin with) and its own version tree. Notably, creating the clone virtual disk from the parent virtual disk does not involve copying any data from the parent virtual disk. When writes occur information will be written to the clone virtual disk, but reading will occur from the parent virtual disk unless a write request has previously written to the location in the clone disk where the read will occur.

In step 612 the name of the parent virtual disk and the snapshot version used are recorded for future use. Both are retrieved from the clone command. Because the cloned virtual disk was created from a particular version of the parent virtual disk at a particular point in time, it will be necessary to refer to the version tree of the parent virtual disk when performing certain read operations. Preferably, the parent virtual disk and version are recorded in the relevant metadata node for the clone virtual disk.

When first created the actual space allocated for the clone virtual disk is empty; however, reads and writes may be performed on the clone virtual disk in the same way that these operations are performed on the parent virtual disk with the exception of a variation in how a read is performed.

In step 616 the virtual machine to which the clone virtual disk has been attached writes to the clone virtual disk. This step may be performed as previously described with respect to FIG. 7. Note that writing to a clone virtual disk does not write data into the parent virtual disk. The clone virtual disk is a separate virtual disk within the storage platform. All data written to the clone virtual disk is placed into containers associated with the clone virtual disk.

In step 620 the virtual machine to which the clone virtual disk has been attached reads from the clone virtual disk. This step generally follows the flow shown in FIG. 9; if data is found in step 624 (container locations are found in step 372 in FIG. 9), then in step 628 (FIG. 15), the data is read from the clone virtual disk.

On the other hand, if an attempt is made to read from the clone virtual disk at a particular offset and no data is found in step 624, then the data must be read from the parent virtual disk. On a write operation the relevant metadata node for a particular virtual disk will record that the write has been performed for a particular portion or container of that virtual disk. Thus, if querying the metadata node in step 372 does not find that a write has been performed for this portion or container, this means that no data has been written to the clone virtual disk as of this time, and the following steps are performed. First, the parent virtual disk name and its snapshot version are retrieved from the location where they were stored in step 612, that is, in the metadata node for the clone virtual disk.

Because the clone virtual disk was created from a particular snapshot of the parent virtual disk, any read must take place from the version where the snapshot was created. Accordingly, the name of the parent virtual disk is used to find the correct metadata node that holds the metadata for that parent virtual disk, and from there the version tree for that parent virtual disk is retrieved. Next, using the version from the clone command, the version tree of the parent virtual disk is walked from that version back to the root to obtain the appropriate version numbers for a read operation or request. For example, if a clone virtual disk was created based upon Snapshot "5" of a parent virtual disk having a version tree such as is shown in FIG. 14, then the correct version numbers to supply to the read request are 5, 4, 2, 1. These version numbers are then used to perform a read request from the parent virtual disk as per steps 368-384 (FIG. 9). The offset and size parameters were originally supplied in the read request at step 620 (FIG. 15).

In this fashion, correct data is read from the parent virtual disk. Once data is written into the clone disk at a particular offset, any future reads from that offset will read from the clone disk and not from the parent disk.

Multiple Clusters

FIG. 1 also illustrates how the computer nodes of the storage platform may be organized into various clusters. Shown are two clusters, 62 and 64, that each include three computer nodes. Coordination between nodes such as those of storage platform 20 that provides distributed storage can be difficult. A number of software products may be used to provide this coordination. One in particular is "Apache ZOOKEEPER," an open source project that provides centralized infrastructure and services across a single cluster of computer nodes for storage of data. For example, ZOOKEEPER provides a configuration service, a synchronization service, a naming service, and other services that can used by an application to ensure that tasks across the cluster are serialized or synchronized. Although such software is highly reliable, it is expensive in terms of throughput and latency. In other words, storing a data object into a single cluster using the software can become a bottleneck for performance of the entire storage platform. And, while ZOOKEEPER may be used to store data into a single cluster of computer nodes, if there is more than one cluster of nodes these clusters will be independent and will not be able to coordinate storage between themselves. An improved system that provides for greater throughput is desirable. In general, the ZOOKEEPER software is an example of replicated PAXOS instance software, and is an implementation of the prior art "Chubby Service."

Figure 16:
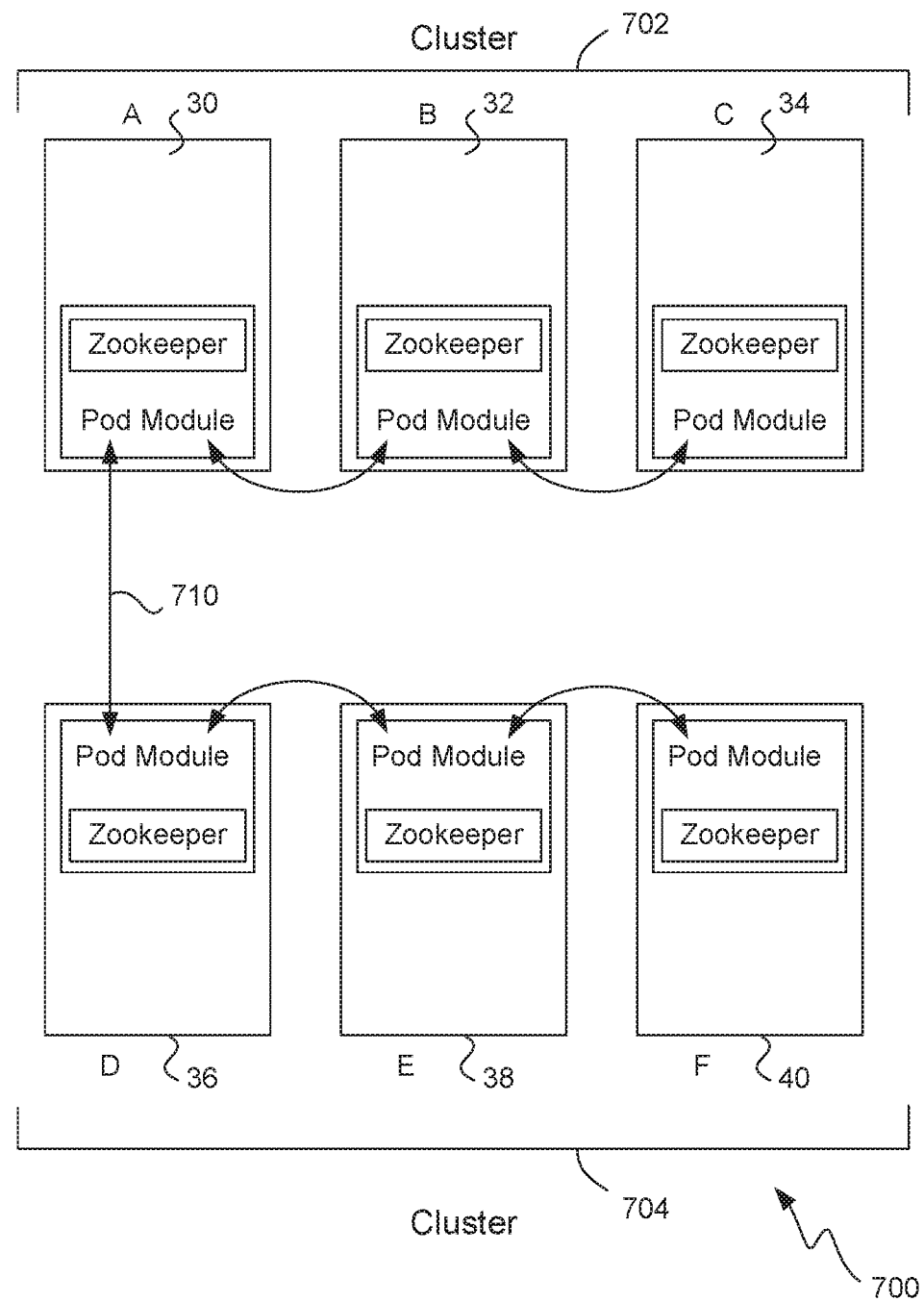
FIG. 16 illustrates an architecture of the storage platform used to overcome throughput and latency problems with coordination software.

FIG. 16 illustrates an architecture 700 of the storage platform 20 used to overcome throughput and latency problems with coordination software such as ZOOKEEPER. Instead of a single ZOOKEEPER cluster providing coordination for a number of machines, multiple ZOOKEEPER clusters are used to provide greater throughput for the entire platform. Shown are clusters 702 and 704. Of course, there may be many more such clusters within a particular platform. And, although three machines are shown in each of the clusters, typically a cluster includes anywhere from three to five machines, or more. As is known in the art, each computer node of cluster 702 includes a ZOOKEEPER instance which is in communication with the other instances within cluster 702 (not shown for clarity is a bidirectional link between node 30 and node 34). In this embodiment, the pod module of each computer node (explained above) incorporates the ZOOKEEPER instance as well as other software. Another ZOOKEEPER cluster 704 is also shown. Unlike the prior art, though, the various ZOOKEEPER clusters can communicate with one another as described below, and thus appear as a single ZOOKEEPER cluster. Each cluster is aware of the other clusters.

Thus, the speed with which data objects can be written to storage platform 20 is increased by a factor of two in this example. If there were four ZOOKEEPER clusters (for example), the speed would then be increased by a factor of four over use of a single traditional ZOOKEEPER cluster, etc. Advantageously, a software application (such as one of the applications executing within the compute farm) can simply perform a write to what it thinks is a single ZOOKEEPER cluster, when in actuality there may be any number of ZOOKEEPER clusters all operating in concert to write the data as quickly as possible. Other entities that may write to a ZOOKEEPER cluster include one of the modules of the platform, a controller virtual machine, one of the metadata nodes, one of the data nodes, etc.

Figure 17:
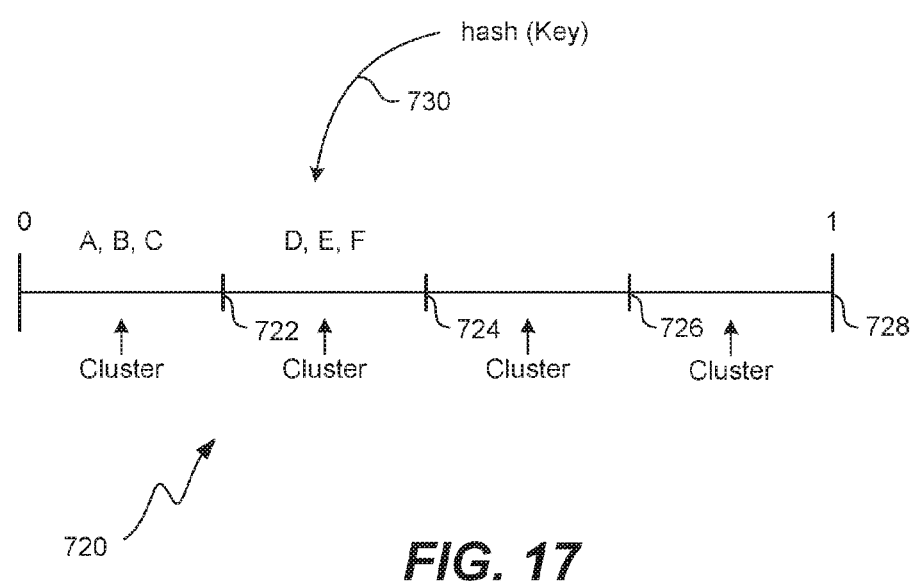
FIG. 17 illustrates use of a distributed hash table in order to implement an embodiment of the present invention.

FIG. 17 illustrates use of a distributed hash table in order to implement an embodiment of the present invention. As known in the art, often a key/value pair is needed to be stored; hash functions are used to map the particular key into a particular hash result, which is then used to store the value into a location dictated by the hash result. Rather than use a single hash function (or single hash table) to map keys to different computer nodes for storage, this embodiment maps keys to different clusters of computer nodes, thus enabling a write request or a read request to be able to write to, or read from, any number of ZOOKEEPER clusters within a storage platform.

Shown is use of a hash function 720. In this simple example, the range of possible results of the hash function is from 0 up to 1, and the range is divided up into four portions, each portion corresponding to a particular ZOOKEEPER cluster within the platform. For example, the range of results from 0 up to point 722 corresponds to cluster 62 (computer nodes A, B, C), and the range of results from point 722 two point 724 corresponds to cluster 64 (computer nodes D, E, F). The other two portions correspond to other potential clusters within the platform. Of course, the range of possible results of the hash function may be quite different, any particular hash function may be used (or similar functions), and there may be any number of clusters within the platform. In this example, a hash of a particular key results in a result 730 that corresponds to cluster 64. Thus, if a value associated with the particular key is desired to be stored within the platform, this example shows that the information will be stored within cluster 64.

In this embodiment, each pod module on each computer node executes a process to implement such a hash function, thus providing a distributed hash table between all of the computer nodes. In the context of storage platform 20, these coordinated clusters are used to write transactional information into the metadata nodes of the cluster. Because of the reliability of information stored within a ZOOKEEPER cluster, if there is a failure of any one of the nodes, the information may be safely retrieved from one of the other nodes within the cluster.

Figure 18:
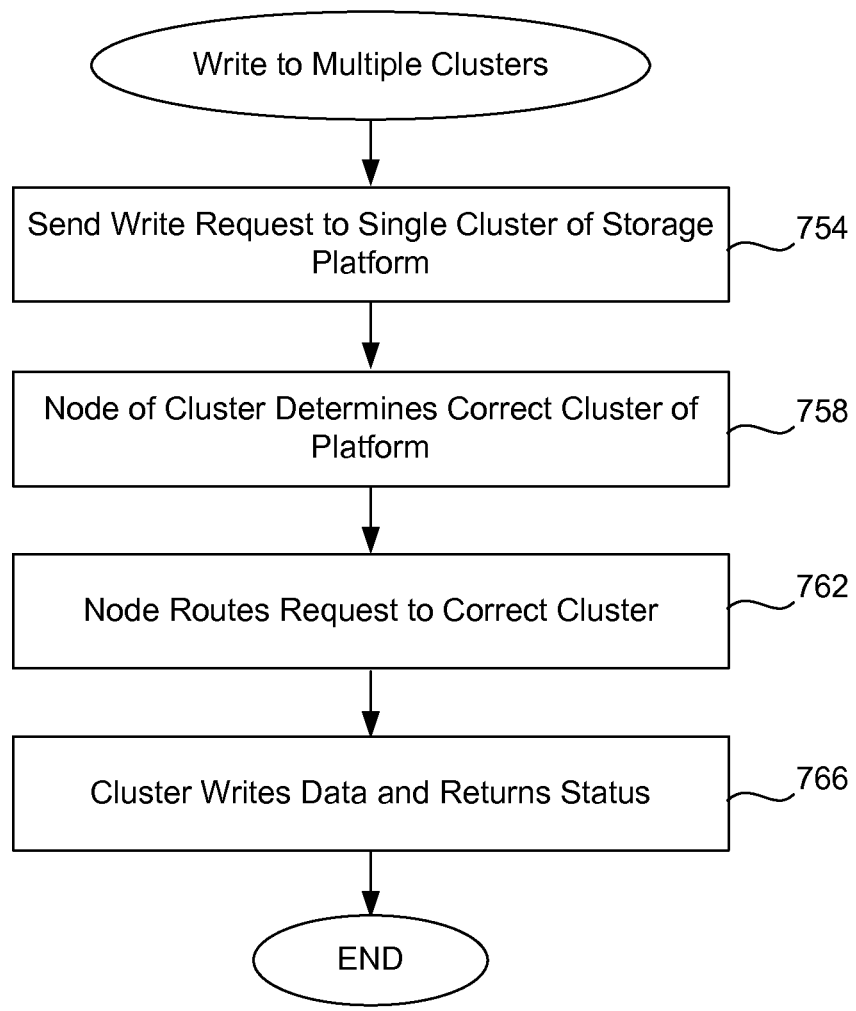
FIG. 18 is a flow diagram describing an embodiment in which data may be written to one of many clusters within a storage platform.

FIG. 18 is a flow diagram describing an embodiment in which data may be written to one of many clusters within a storage platform. In this particular embodiment, each cluster may be a ZOOKEEPER cluster as shown in FIG. 16. In step 754 a write request is sent to a single cluster of the storage platform (for example, cluster 704) using a protocol suitable for storing data within a single ZOOKEEPER cluster. The write request may originate from any source, although in this example it originates with one of the virtual machines executing upon one of the computer servers 50-52.

The write request includes a "key" identifying information to be stored and a "value" which is the actual data to be stored. Advantageously, an entity sending a write request need only communicate with a single ZOOKEEPER cluster of the platform and requests will be distributed throughout the clusters of the platform as dictated by the distributed hash table. Also, the entity may send the request to any cluster of the platform.

In step 758 one of the computer nodes of the cluster (node E, for example) fields the write request and determines which is the correct cluster of the platform to which the request should be sent. More specifically, the pod software module executing on the computer node takes the key from the write request, calculates a hash result using the hash function, and then determines to which cluster the request should be sent using the distributed hash table (for example, as shown in FIG. 17). Each pod module executing on each computer node uses the same hash function and distributed hash table in order to route write requests appropriately throughout the storage platform. For example, the pod module executing on node E may determine that the hash result falls between 0 and point 722 and thus the write request should be sent to cluster 702.

Next, in step 762 node E routes the write request to cluster 702, for example, via communication link 710. It is possible that the write request should be routed to the same cluster in which the hash result is calculated. In other words, the request is not routed to a different cluster but stays within the same cluster.

In step 766 the cluster 702 will then write the data value to each of its nodes using the ZOOKEEPER protocol. Finally, this cluster return status information to the entity that requested the write.

Thus, any number of different entities (such as the virtual machines of FIG. 1 or any of nodes 30-40) may send write requests to any cluster within platform 20; the steps described above will ensure that these write requests are distributed throughout the platform to different ZOOKEEPER clusters thus increasing the throughput by factor equal to the number of ZOOKEEPER clusters.

In a similar fashion the platform may handle read requests. Instead of a write request being sent in step 754 the entity sends a read request to a single cluster in the platform including only the key for the data value desired. The correct cluster is determined in step 758, the read request is routed to the correct cluster in step 762, in step 766 the correct cluster then uses the key to obtain the appropriate data value and returns the data value to the entity that had sent the read request.

Timestamp Generation

Figure 19:
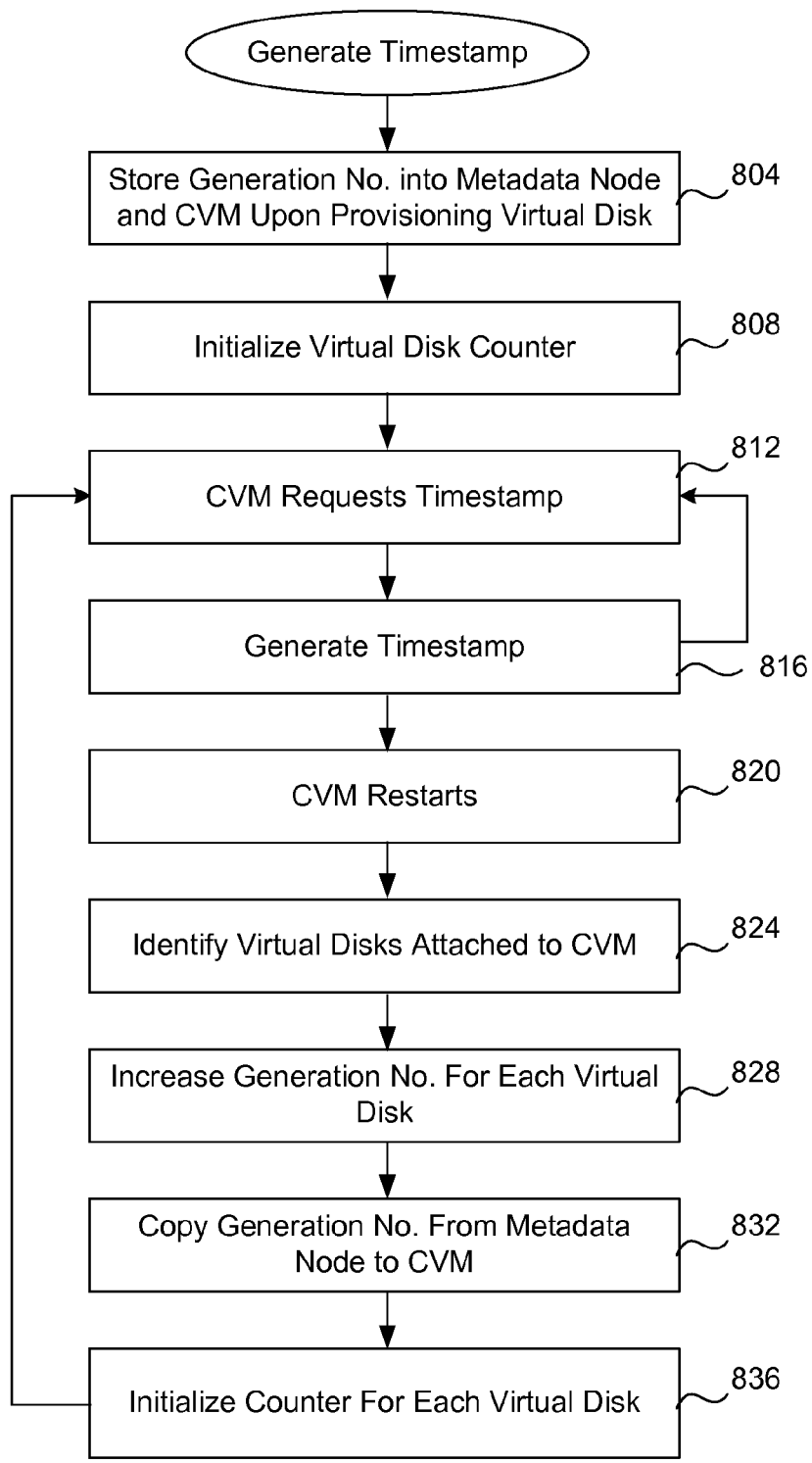
FIG. 19 is a flow diagram describing one embodiment by which a timestamp is generated.

FIG. 19 is a flow diagram describing one embodiment by which a timestamp is generated. Within a storage system, it is often desirable to place a timestamp in association with stored blocks of data in order to indicate when the data was stored, to be able to retrieve the latest data, to be able to retrieve different versions, and to coordinate I/O handling between different computers or virtual machines. Unfortunately, relying upon a clock within a computer (or from an outside source) is often not practical as the clocks between computers may be keeping slightly different time. In the context of the present invention, if the controller virtual machines on different computers are keeping slightly different time then it can be problematic to exchange data between these CVMs or to move a virtual disk from one CVM to another.

One embodiment of the present invention provides a technique for providing a monotonically increasing counter for each virtual disk that guarantees that each request to generate a timestamp for the virtual disk returns an increasing value. Advantageously, no persistent storage is needed by the CVM in order to keep track of the increasing values in order to generate a timestamp when needed by a virtual disk. Even when the controller virtual machine or its host computer crashes and needs to be restarted, there is still a guarantee that the next request for a timestamp for a particular virtual disk will be a monotonically increasing value that is greater than the previous value requested for that virtual disk. And, no clock values are needed to generate a timestamp.

During I/O handling for a particular virtual disk each write request or read request (steps 316 (FIG. 7) and 376 (FIG. 9)) will include a timestamp. A single timestamp is generated for each write request and this timestamp is associated with all blocks that are written to the virtual disk for that write. As shown in the metadata module storage of FIG. 22B, along with the container identifiers stored in association with a particular node, a block identifier and a timestamp (TS) is stored for each block written into a particular container. If a write request for a particular virtual disk necessitates writing a number of blocks, each block written will have the same timestamp. During a read request, use of the timestamp ensures that the latest valid data is read from the virtual disk.

In step 804 a generation number for a particular virtual disk is initialized when that virtual disk is provisioned as discussed above with respect to FIG. 5. During step 212 (FIG. 5) the generation number is set equal to "1" and this generation number is stored into the metadata node for that virtual disk, for example, stored into metadata 862 for the virtual disk "Avinash." In addition, during the attach step 216 (FIG. 5), this same generation number is also stored into memory of the controller virtual machine to which the virtual disk has been attached. Note that although the generation number is placed into persistent storage on the metadata node, it may be stored in volatile memory of the CVM.

Figure 20:
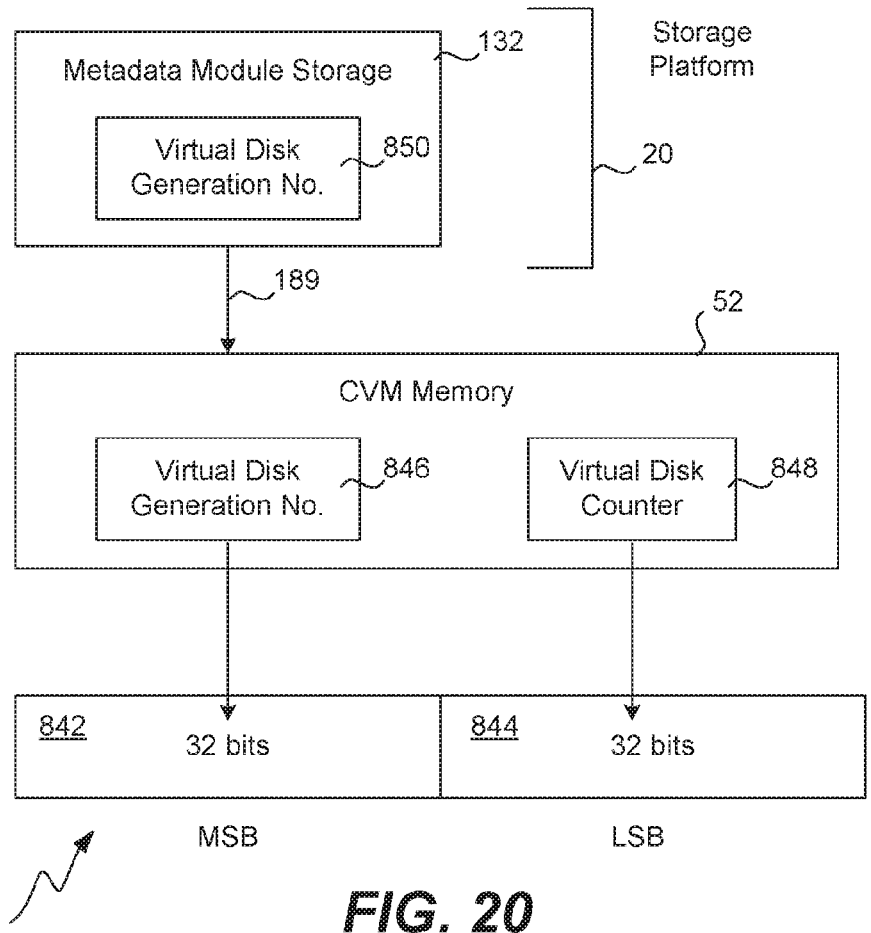
FIG. 20 illustrates how a timestamp is generated for a particular virtual disk whenever there is a write request.

FIG. 20 illustrates how a timestamp 840 is generated for a particular virtual disk whenever there is a write request. Shown is storage of the virtual disk generation number 850 in the metadata module corresponding to the particular virtual disk, and storage of the virtual disk generation number 846 into memory of the CVM to which that virtual disk is attached.

In step 808 in FIG. 19 a counter is initialized for the particular virtual disk. Again, initialization of this counter may occur in step 216 (FIG. 5) when the virtual disk is attached to a particular virtual machine. Preferably, the counter is implemented by the CVM and may be implemented in hardware or software; any of a variety of counters as known in the art may be used. The counter is initialized with a value of "0" and each time a request is made of the counter its value is incremented by "1" and that new value is returned. As shown in FIG. 20, each CVM includes a virtual disk counter 848 for each virtual disk attached to that CVM.

In step 812 the CVM requests a new timestamp for a particular virtual disk whenever it needs to write data to the virtual disk.

In step 816 a new timestamp is generated. As shown in FIG. 20, a timestamp is a 64-bit value with MSB 842 of 32 bits and LSB 844 of 32 bits. Of course, other sizes of a timestamp and of the MSB and LSB may also be used. In order to generate the timestamp the value of the generation number 846 from the CVM memory is placed into the MSB of the timestamp and a request is made of the virtual disk counter 848 for a new value which is placed into the LSB of the timestamp. Once generated, this timestamp is then returned to the CVM for use in the write request.

In step 820, at some point in time it is possible that a particular controller virtual machine or its host computer must restart or bootstrap (reboot) such that any volatile memory contents are lost. This restart may occur because the CVM crashes, because the hypervisor crashes, because the host computer crashes, because of a manual restart, or for other reasons. As mentioned above, because the generation number 846 and the counter 848 are stored in memory of the CVM host computer, these values will be lost upon a restart. In order to continue to provide a monotonically increasing value to the CVM when needed for a write request the following steps are taken.

In step 824 the CVM queries the storage platform in order to determine which virtual disks are attached to that CVM. As shown in FIG. 22A, each computer node of the storage platform includes a metadata module which stores in persistent storage metadata information for all virtual disks associated with that computer node. As shown in metadata 862 (for example), this metadata includes the generation number for each virtual disk. By querying each computer node of the storage platform in turn, the CVM can determine not only which were the virtual disks attached to that particular CVM, but also the current generation number for each of those virtual disks. Also included within the virtual disk information is the IP address (or other unique identifier) of the CVM to which the virtual disk is attached. In this fashion, any CVM can determine to which CVM a particular virtual disk is attached.

In step 828, once those virtual disks are identified that are attached to the CVM that was restarted, the CVM directs that each generation number within the metadata be increased by "1." Thus, for example, a virtual disk which had a generation number of "1" before the CVM was restarted will now have a new generation number of "2." In step 832 this new generation number for each virtual disk is copied from metadata on a metadata node to CVM memory as shown in FIG. 20, i.e., from location 850 to location 846. In step 836 each virtual disk counter 848 of the CVM is also initialized as described above in step 808. In this fashion, the next request for a timestamp by the CVM will result in a monotonically increasing value.

Figure 21:
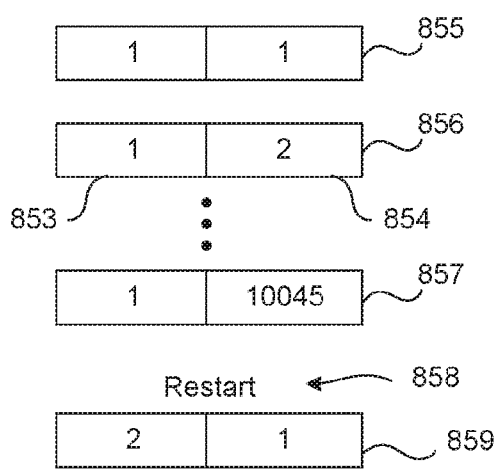
FIG. 21 illustrates how requests for a timestamp result in monotonically increasing values.

FIG. 21 illustrates how requests for a timestamp results in monotonically increasing values even in the context of a restart of the computer, controller virtual machine or software application. The first two requests for a timestamp result in values 855 and 856 being returned. Value 856 shows that the timestamp is made up of two values, namely MSB 853 (which corresponds to the generation number) and LSB 854 which corresponds to the virtual disk counter. As I/O handling occurs, and the values increase monotonically (by virtue of the virtual disk counter increasing), eventually a value such as value 857 will be returned. At 858 a restart occurs resulting in the loss of memory and of the generation number and counter for a particular virtual disk on a particular host computer 52. Using the above generation technique, the next request for a timestamp results in value 859 which is a monotonically increasing value after value 857.

Storage of Metadata

FIGS. 22A and 22B illustrate metadata storage within platform 20. The metadata used within storage system 10 encompasses many types and includes: virtual disk information; container location information (including on which storage pools the containers are located and on which nodes); storage pool information (including which nodes have which pools and which disks); and, mutation information after write requests (where were blocks written, success and failure, etc.). As mentioned earlier, while the data associated with a particular write request may end up on three different data nodes, the metadata information associated with virtual disks, write requests, etc. will be stored using the metadata modules 130 on the computer nodes, and these nodes may be different from the nodes used for data storage.

FIG. 22A illustrates three types of information stored by a metadata module. Each of these types of information may use any suitable data structure and each type of information is independent of the others and may use a different data structure. Shown, for example, is persistent storage on node A that has been stored by its metadata module. Shown at 860 is the storage pool information or metadata for that node, showing which storage pools are present on that node and which disks are associated with each storage pool. Shown at 861 is container location information or metadata. Using the naming convention for containers discussed above, this shows that container "Vi$2" (associated with virtual disk "Vi") is located on node A and that it is part of storage pool SP3. The second listed container Vj$7 is shown as being part of the storage pool SP2. Of course, many other containers that are stored on node A may also be listed in this data structure. Shown at 862 are all of the policies and other metadata information for the virtual disk named "Avinash." Of course, any number of virtual disks may also have their information or metadata 864 stored on this particular node.

FIG. 22B illustrates another type of information stored by a metadata module. Shown, for example, is persistent storage on node D that has been stored by its metadata module. Shown symbolically (not to scale) at 870 is a virtual disk showing how its stored information is represented within metadata storage. In this example, assume that the virtual disk has a size of 1 TB, that each chunk portion has a size of 256 kB, assume that each block has a size of 4 kB, and that 66 blocks have been written into this virtual disk. Chunks 871 and 872 illustrate that metadata is stored on a per chunk basis.

For a particular virtual disk "Vi" 880 (this metadata storage region having any number of rows of information, each row representing a virtual disk), write information is stored in columns 882, 884, etc., each column corresponding to a particular chunk of the virtual disk. For example, column 882 represents the first chunk and also includes the version number. Column 884 represents the second chunk. In this embodiment, there will be a new column if the version is incremented and one writes again into the first chunk. In this fashion, older versions of data are never overwritten or lost, they are all saved within the storage platform for later reference if necessary.

Within each chunk column 882, are individual block columns 890, 892, etc., representing the individual blocks of that chunk that have been written to the virtual disk. For example, column 890 includes the block number "1," the computer nodes to which that block was written, whether not the write was a success, and a timestamp. Column 892 includes similar information for the second block. Within column 882 there will be 64 individual block columns due to the size of the blocks and the size of the chunks. Column 884 will also include the same number of block columns, for example, block column 896 identifies the block number "66," and the information earlier described. In this fashion, the metadata for particular virtual disk 880 is stored upon one of the computer nodes using its metadata module, and includes an identification of where each of its blocks were stored, a version, a timestamp, etc.

FIG. 23 shows information that may be stored within memory cache 181 (see FIG. 4, e.g.) of a controller virtual machine (CVM) 180 on one of the computer servers. Preferably, all information concerning a particular virtual disk attached to a CVM will be organized into a virtual disk object and then stored into the memory cache. A hash table is used to store these virtual disk objects and the key to find each object is the name of the virtual disk. Stored within this cache is the generation number 846, virtual disk information 260 and metadata nodes 898 indicating on which nodes the metadata for this virtual disk is stored.

Computer System Embodiment

Figure 24:
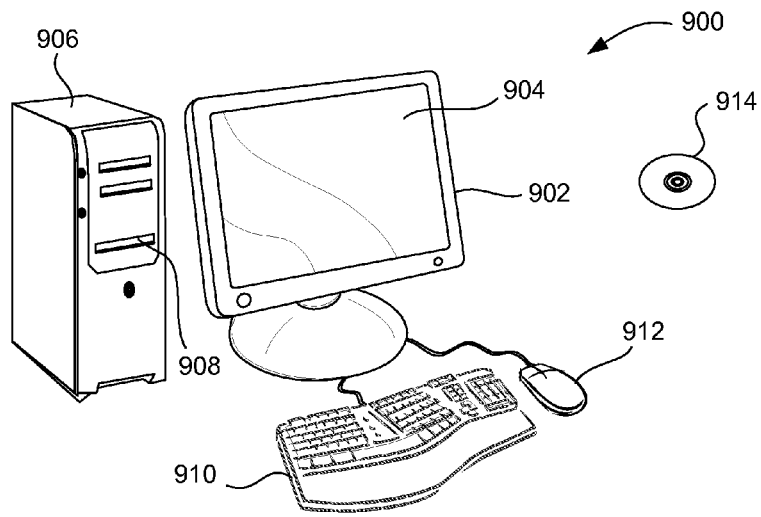
FIGS. 24 and 25 illustrate a computer system suitable for implementing embodiments of the present invention.
Figure 25:
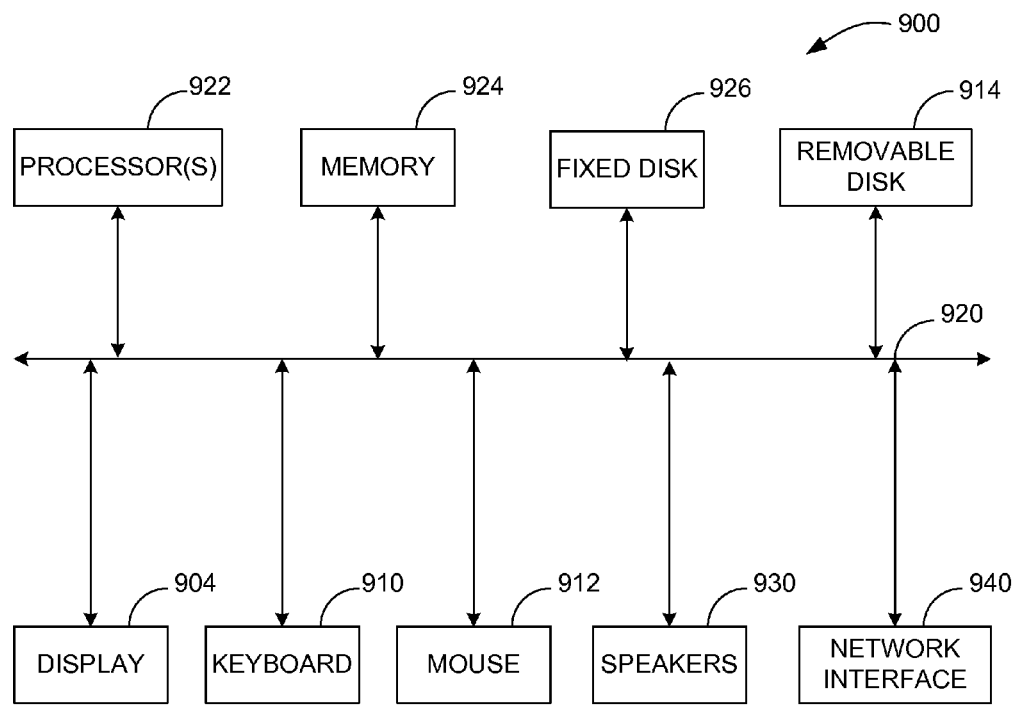

FIGS. 24 and 25 illustrate a computer system 900 suitable for implementing embodiments of the present invention. FIG. 24 shows one possible physical form of the computer system. Of course, the computer system may have many physical forms including an integrated circuit, a printed circuit board, a small handheld device (such as a mobile telephone or Personal Digital Assistant (PDA)), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 25 is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to processor(s) 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

Processor(s) 922 is/are also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. Processor(s) 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon processor(s) 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as compact disc-read only memories (CD-ROMs) and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of cloning a virtual disk within a storage platform, said method comprising:

storing data for said virtual disk onto computer nodes of said storage platform, said stored data stored as blocks of data wherein each block of data has an associated version number, said virtual disk having a plurality of first policies regarding how said blocks of data are stored on said storage platform;

issuing a clone command for said virtual disk having a current version without copying contents of said virtual disk, said clone command indicating a prior version of said virtual disk from which a clone virtual disk should be created and including at least one second policy;

provisioning said clone virtual disk within said storage platform using said at least one second policy of said clone virtual disk different from said first policies regarding how data of said clone virtual disk is stored on said storage platform;

writing first data from a software application on a computer server remote from said storage platform onto said clone virtual disk, said data being written onto storage disks of said storage platform using said at least one second policy; and reading second data from said clone virtual disk by walking a version tree of said virtual disk from said prior version to a root to obtain version numbers for a read request, and then performing said read request to read said second data from said virtual disk using said version numbers.

2. A method as recited in claim 1 wherein said clone virtual disk is created after said issuing said clone command without copying contents of said virtual disk and without allocating disk space in said storage platform.

3. The method as recited in claim 1 further comprising:

recording, on a metadata computer node within said storage platform, said current version of said virtual disk and said version tree of said virtual disk indicating from which version of said virtual disk a later version originates.

4. A method as recited in claim 1 wherein said at least one second policy includes at least one of replication factor, residence, compressed, de-duplication, replication policy, and cache enabled.

5. A method as recited in claim 1 wherein said read request is sent by a controller virtual machine of said computer server to said computer nodes, and the obtained version numbers are sent by the controller virtual machine when the read request is sent.

6. A method as recited in claim 1 further comprising:

using said version numbers by only reading said second data that includes one of said version numbers.

* * * * *